United States Patent
Minoda et al.

(10) Patent No.: US 10,984,026 B2
(45) Date of Patent: Apr. 20, 2021

(54) SEARCH METHOD FOR PERFORMING SEARCH BASED ON AN OBTAINED SEARCH WORD AND AN ASSOCIATED SEARCH WORD

(71) Applicant: Panasonic Intellectual Property Management Co., Ltd., Osaka (JP)

(72) Inventors: Yuki Minoda, Tokyo (JP); Koji Morikawa, Tokyo (JP); Asuka Sakai, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 529 days.

(21) Appl. No.: 15/943,743

(22) Filed: Apr. 3, 2018

(65) Prior Publication Data

US 2018/0307694 A1 Oct. 25, 2018

Related U.S. Application Data

(60) Provisional application No. 62/489,739, filed on Apr. 25, 2017.

(30) Foreign Application Priority Data

Sep. 6, 2017 (JP) .............................. JP2017-170860

(51) Int. Cl.
*G06F 16/332* (2019.01)
*G06F 3/01* (2006.01)
(Continued)

(52) U.S. Cl.
CPC .......... *G06F 16/3322* (2019.01); *G06F 3/015* (2013.01); *G06F 16/3329* (2019.01); *G06F 40/284* (2020.01); *G06F 40/30* (2020.01)

(58) Field of Classification Search
CPC .... G06F 40/30; G06F 40/284; G06F 16/3329; G06F 3/015; G06F 16/3322; G06Q 30/0631
See application file for complete search history.

(56) References Cited

U.S. PATENT DOCUMENTS

2010/0262576 A1* 10/2010 Stockwell ............... G06F 40/30
706/55
2016/0179945 A1* 6/2016 Lastra Diaz ........ G06F 16/3334
707/739

FOREIGN PATENT DOCUMENTS

JP 2015-018453 1/2015

OTHER PUBLICATIONS

Crampes, Concept maps for designing adaptive knowledge maps, pp. 211-224. (Year: 2006).*

(Continued)

*Primary Examiner* — Albert M Phillips, III
(74) *Attorney, Agent, or Firm* — Wenderoth, Lind & Ponack, L.L.P.

(57) ABSTRACT

A method includes (a) obtaining a search word, (b) obtaining first to third concept maps including words and semantic distances between the words, (c) obtaining a first association map including degrees of association indicating how close the semantic distances included in the first and second concept maps are to each other; (d) obtaining a second association map including degrees of association indicating how close the semantic distances included in the first to third concept maps are to one another, (e) extracting, from the words as an associated word, at least one word whose difference between the degree of association with the search word included in the first association map and the degree of association with the search word included in the second association map is equal to or larger than a first threshold, (Continued)

and (f) outputting a result of a search based on the search word and the associated word.

16 Claims, 26 Drawing Sheets

(51) Int. Cl.
*G06F 40/30* (2020.01)
*G06F 40/284* (2020.01)

(56) References Cited

OTHER PUBLICATIONS

Alexander G. Huth et al., "Natural speech reveals the semantic maps that tile human cerebral cortex", nature, vol. 532, Apr. 27, 2016, pp. 453-458 and Supplemental Material.

Greg Linden et al., "Amazon.com Recommendations: Item-to-Item Collaborative Filtering", IEEE Internet Computing, vol. 7, No. 1, Jan. 22, 2003, pp. 76-80.

\* cited by examiner

FIG. 4A

|  | home | rent | owner | house | park | place | car | weekend |
|---|---|---|---|---|---|---|---|---|
| home | 0 | 2 | 4 | 1 | 5 | 2 | 1 | 1 |
| rent | 2 | 0 | 3 | 2 | 4 | 2 | 5 | 2 |
| owner | 4 | 3 | 0 | 3 | 4 | 3 | 2 | 4 |
| house | 1 | 2 | 3 | 0 | 5 | 2 | 2 | 1 |
| park | 5 | 4 | 4 | 5 | 0 | 1 | 2 | 2 |
| place | 2 | 2 | 3 | 2 | 1 | 0 | 2 | 1 |
| car | 1 | 5 | 2 | 2 | 2 | 4 | 0 | 2 |
| weekend | 1 | 2 | 4 | 1 | 2 | 1 | 2 | 0 |

FIG. 4B

|  | home | rent | owner | house | park | place | car | weekend |
|---|---|---|---|---|---|---|---|---|
| home | 0 | 3 | 2 | 1 | 5 | 2 | 1 | 5 |
| rent | 3 | 0 | 5 | 3 | 6 | 2 | 4 | 3 |
| owner | 2 | 5 | 0 | 2 | 6 | 2 | 2 | 6 |
| house | 1 | 3 | 2 | 0 | 5 | 2 | 3 | 5 |
| park | 5 | 6 | 6 | 5 | 0 | 1 | 3 | 1 |
| place | 2 | 2 | 2 | 2 | 1 | 0 | 4 | 4 |
| car | 1 | 4 | 2 | 3 | 3 | 4 | 0 | 1 |
| weekend | 5 | 3 | 6 | 5 | 1 | 4 | 1 | 0 |

FIG. 4C

|  | home | rent | owner | house | park | place | car | weekend |
|---|---|---|---|---|---|---|---|---|
| home | 0 | 2 | 3 | 1 | 5 | 2 | 4 | 1 |
| rent | 2 | 0 | 3 | 2 | 4 | 3 | 3 | 4 |
| owner | 3 | 3 | 0 | 3 | 4 | 3 | 2 | 3 |
| house | 1 | 2 | 3 | 0 | 5 | 2 | 4 | 1 |
| park | 5 | 4 | 4 | 5 | 0 | 3 | 4 | 2 |
| place | 2 | 3 | 3 | 2 | 3 | 0 | 4 | 1 |
| car | 4 | 3 | 2 | 4 | 4 | 4 | 0 | 4 |
| weekend | 1 | 4 | 3 | 1 | 2 | 1 | 4 | 0 |

FIG. 4D

|         | home | rent | owner | house | park | place | car | weekend |
|---------|------|------|-------|-------|------|-------|-----|---------|
| home    | 0    | 3    | 2     | 1     | 2    | 2     | 1   | 4       |
| rent    | 3    | 0    | 5     | 3     | 6    | 3     | 3   | 5       |
| owner   | 2    | 5    | 0     | 2     | 6    | 2     | 1   | 5       |
| house   | 1    | 3    | 2     | 0     | 2    | 1     | 1   | 5       |
| park    | 2    | 6    | 6     | 2     | 0    | 2     | 1   | 4       |
| place   | 2    | 3    | 2     | 1     | 2    | 0     | 1   | 4       |
| car     | 1    | 3    | 1     | 1     | 1    | 1     | 0   | 1       |
| weekend | 4    | 5    | 5     | 5     | 4    | 4     | 1   | 0       |

FIG. 5 waiting
parked
leaving rent
bus office hotel
hours home car
apartment
visit motel taxi
hour parking
arrive owner
house
rented

FIG. 6 twenty
motel months
vacation
weeks week next
rented
five home hours
apartment
hour year rent
month
ten hotel
house
weekend

FIG. 8A

|  | home | rent | owner | house | park | place | car | weekend |
|---|---|---|---|---|---|---|---|---|
| home | 0 | 1 | 4 | 0 | 0 | 0 | 0 | 16 |
| rent | 1 | 0 | 4 | 1 | 1 | 0 | 1 | 1 |
| owner | 4 | 4 | 0 | 1 | 4 | 1 | 0 | 4 |
| house | 0 | 1 | 1 | 0 | 0 | 0 | 1 | 16 |
| park | 0 | 4 | 4 | 0 | 0 | 0 | 1 | 1 |
| place | 0 | 0 | 1 | 0 | 0 | 0 | 0 | 9 |
| car | 0 | 1 | 0 | 1 | 1 | 0 | 0 | 1 |
| weekend | 16 | 1 | 4 | 16 | 1 | 9 | 1 | 0 |

FIG. 8B

| | home | rent | owner | house | park | place | car | weekend |
|---|---|---|---|---|---|---|---|---|
| home | 1.00 | 0.50 | 0.20 | 1.00 | 1.00 | 1.00 | 1.00 | 0.06 |
| rent | 0.50 | 1.00 | 1.00 | 0.50 | 0.20 | 0.50 | 0.50 | 0.50 |
| owner | 0.20 | 0.20 | 1.00 | 0.50 | 0.20 | 1.00 | 1.00 | 0.20 |
| house | 1.00 | 0.50 | 0.50 | 1.00 | 1.00 | 1.00 | 0.50 | 0.06 |
| park | 1.00 | 0.20 | 0.20 | 1.00 | 1.00 | 1.00 | 1.00 | 0.50 |
| place | 1.00 | 1.00 | 0.50 | 1.00 | 0.50 | 1.00 | 1.00 | 0.10 |
| car | 1.00 | 0.50 | 1.00 | 0.50 | 0.50 | 0.10 | 1.00 | 0.50 |
| weekend | 0.06 | 0.50 | 0.20 | 0.06 | 0.50 | 0.10 | 0.50 | 1.00 |

FIG. 10A

|         | home | rent | owner | house | park | place | car | weekend |
|---------|------|------|-------|-------|------|-------|-----|---------|
| home    | 0    | 4    | 11    | 0     | 27   | 0     | 27  | 51      |
| rent    | 4    | 0    | 16    | 4     | 16   | 4     | 11  | 20      |
| owner   | 11   | 16   | 0     | 4     | 16   | 4     | 3   | 20      |
| house   | 0    | 4    | 4     | 0     | 27   | 3     | 20  | 64      |
| park    | 27   | 16   | 16    | 27    | 0    | 11    | 20  | 19      |
| place   | 0    | 4    | 4     | 3     | 11   | 0     | 27  | 36      |
| car     | 27   | 11   | 3     | 20    | 20   | 27    | 0   | 24      |
| weekend | 51   | 20   | 20    | 64    | 19   | 36    | 24  | 0       |

FIG. 10B

|  | home | rent | owner | house | park | place | car | weekend |
|---|---|---|---|---|---|---|---|---|
| home | 1.00 | 0.20 | 0.08 | 1.00 | 0.04 | 1.00 | 0.04 | 0.02 |
| rent | 0.20 | 1.00 | 0.06 | 0.20 | 0.06 | 0.20 | 0.08 | 0.05 |
| owner | 0.08 | 0.06 | 1.00 | 0.20 | 0.06 | 0.20 | 0.25 | 0.05 |
| house | 1.00 | 0.20 | 0.20 | 1.00 | 0.04 | 0.25 | 0.05 | 0.02 |
| park | 0.04 | 0.06 | 0.20 | 0.04 | 1.00 | 0.08 | 0.05 | 0.05 |
| place | 1.00 | 0.20 | 0.25 | 0.25 | 0.08 | 1.00 | 0.04 | 0.03 |
| car | 0.04 | 0.08 | 0.05 | 0.05 | 0.05 | 0.04 | 1.00 | 0.04 |
| weekend | 0.02 | 0.05 | 0.05 | 0.02 | 0.05 | 0.03 | 0.04 | 1.00 |

FIG. 15

| | | | | | | |
|---|---|---|---|---|---|---|
| ASSOCIATED WORD (DEGREE OF ASSOCIATION) | rent (v = 0.05) | - | - | Car (v = 1.00) | - | park (v = 1.00) |
| SEARCH QUERY | CONTRACT TERMS | | | PARKING LOT | | CLOSE TO PARK |
| PROPERTY NAME | CONTRACT TERMS | DISTANCE FROM STATION (ON FOOT) | | PRESENCE OR ABSENCE OF PARKING LOT | AREA | DISTANCE TO PARK |
| PROPERTY A | RENT | 10 min. | | Y | 30.4 m² | 30 min. |
| PROPERTY B | SALE | 5 min. | | N | 20.5 m² | 5 min. |
| ... | ... | ... | | ... | ... | ... |
| PROPERTY E | RENT | 20 min. | | Y | 20.9 m² | 2 min. |
| PROPERTY F | SALE | 3 min. | | N | 22.3 m² | 10 min. |

FIG. 20

| | home | rent | owner | house | park | place | car | weekend |
|---|---|---|---|---|---|---|---|---|
| home | 0 | 25 | 36 | 4 | 100 | 16 | 4 | 36 |
| rent | 25 | 0 | 64 | 25 | 100 | 16 | 81 | 25 |
| owner | 36 | 64 | 0 | 25 | 100 | 25 | 16 | 100 |
| house | 4 | 25 | 25 | 0 | 100 | 16 | 25 | 36 |
| park | 100 | 100 | 100 | 100 | 0 | 4 | 25 | 9 |
| place | 16 | 16 | 25 | 16 | 4 | 0 | 64 | 25 |
| car | 4 | 81 | 16 | 25 | 25 | 64 | 0 | 9 |
| weekend | 36 | 25 | 100 | 36 | 9 | 25 | 9 | 0 |

SEARCH METHOD FOR PERFORMING SEARCH BASED ON AN OBTAINED SEARCH WORD AND AN ASSOCIATED SEARCH WORD

BACKGROUND

1. Technical Field

The present disclosure relates to a search method, a search apparatus, and a nonvolatile computer-readable recording medium.

2. Description of the Related Art

Users of the Internet are increasingly searching for information regarding products and services using search services and the like. When a user searches for candidates for a travel destination, a restaurant, or the like to visit in a certain group, for example, the user needs to input, to an information terminal or the like, a search keyword that will suit tastes of all users belonging to the certain group.

Japanese Unexamined Patent Application Publication No. 2015-18453 discloses a technique for recommending a product, a service, or the like to a certain group on the basis of evaluation values calculated from a history of scores input by all users belonging to a certain group with respect to products, services, and the like.

SUMMARY

In the technique disclosed in Japanese Unexamined Patent Application Publication No. 2015-18453, however, a user needs to input scores in advance. It is therefore difficult, for example, to recommend, to a certain group, a product, a service, or the like for which scores have not been input in advance, such as a product that has not been purchased by the user or a service that has not been used by the user.

In a technique disclosed in G. Linden, B. Smith, and J. York, "Amazon.com Recommendations: Item-to-Item Collaborative Filtering", IEEE Internet Computing, vol. 7, no. 1, 2003, pp. 76-80, a user need not input scores in advance, but because actual buying behavior is used as a basis, it is difficult to apply the technique to product fields in which information regarding buying behavior does not exist.

One non-limiting and exemplary embodiment provides a search method, a search apparatus, and a nonvolatile computer-readable recording medium capable of recommending optimal products, optimal services, and the like to a certain group without using purchase histories.

In one general aspect, the techniques disclosed here feature a search method performed by a processor. The search method includes (a) obtaining a search word, (b) obtaining, from a memory, first to third concept maps including a plurality of words and semantic distances between the plurality of words, the first concept map being unique to a first user belonging to a first group, the second concept map being unique to a second user belonging to the first group, the third concept map being unique to a third user belonging to a second group different from the first group, (c) obtaining a first association map including degrees of association indicating how close the semantic distances included in the first concept map and the semantic distances included in the second concept map are to each other, (d) obtaining a second association map including degrees of association indicating how close the semantic distances included in the first concept map, the semantic distances included in the second concept map, and the semantic distances included in the third concept map are to one another, (e) extracting, from the plurality of words as an associated word, at least one word whose difference between the degree of association with the search word included in the first association map and the degree of association with the search word included in the second association map is equal to or larger than a first threshold, and (f) outputting a result of a search based on the search word and the associated word.

With the search method according the aspect of the present disclosure, optimal products, optimal services, and the like can be recommended to a certain group without using purchase histories.

It should be noted that this general or specific aspect may be implemented as an apparatus, a system, an integrated circuit, a computer program, a computer-readable recording medium including a nonvolatile recording medium such as a compact disc read-only memory (CD-ROM), or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4A is a diagram illustrating an example of a first concept map;

FIG. 4B is a diagram illustrating an example of a second concept map;

FIG. 4C is a diagram illustrating an example of a third concept map;

FIG. 4D is a diagram illustrating an example of a fourth concept map;

FIG. 5 is a diagram schematically illustrating the first to fourth concept maps;

FIG. 6 is a diagram schematically illustrating the first to fourth concept maps;

FIG. 8A is a diagram illustrating an example of concept distances calculated by the group shared concept extraction section according to the first embodiment;

FIG. 8B is a diagram illustrating an example of degrees of association calculated by the group shared concept extraction section according to the first embodiment;

FIG. 10A is a diagram illustrating an example of concept distances calculated by the all user shared concept extraction section according to the first embodiment;

FIG. 10B is a diagram illustrating an example of degrees of association calculated by the all user shared concept extraction section according to the first embodiment;

FIG. 15 is a diagram illustrating an example of the operation of a recommendation request section according to the first embodiment;

FIG. 20 is a diagram illustrating an example of concept average distances calculated by a concept average distance calculation section according to the second embodiment;

DETAILED DESCRIPTION

Figure 1A:
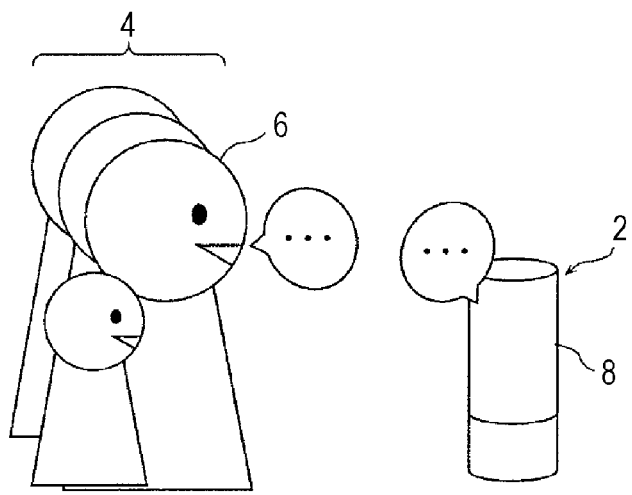
FIG. 1A is a diagram illustrating an example of application of a search system according to a first embodiment.

A search method according to an aspect of the present disclosure is a search method performed by a processor. The search method includes (a) obtaining a search word, (b) obtaining, from a memory, first to third concept maps including a plurality of words and semantic distances between the plurality of words, the first concept map being unique to a first user belonging to a first group, the second concept map being unique to a second user belonging to the first group, the third concept map being unique to a third user belonging to a second group different from the first group, (c) obtaining a first association map including degrees of association indicating how close the semantic distances included in the first concept map and the semantic distances included in the second concept map are to each other, (d) obtaining a second association map including degrees of association indicating how close the semantic distances included in the first concept map, the semantic distances included in the second concept map, and the semantic distances included in the third concept map are to one another, (e) extracting, from the plurality of words as an associated word, at least one word whose difference between the degree of association with the search word included in the first association map and the degree of association with the search word included in the second association map is equal to or larger than a first threshold, and (f) outputting a result of a search based on the search word and the associated word.

According to this aspect, an associated word, which indicates a concept shared by the first and second users belonging to the first group in relation to a search word, is extracted on the basis of the first and second concept maps. Since a search is performed on the basis of the extracted associated word and the search word, optimal products that have not been purchased by the first or second user, optimal products that have not been used by the first or second user, and the like can be recommended to the first group. Furthermore, a word whose difference between the degree of association with the search word included in the first association map and the degree of association with the search word included in the second association map is equal to or larger than the first threshold is extracted from the plurality of words as an associated word. As a result, an associated word, which indicates a concept shared only by the first and second users belonging to the first group, can be extracted, thereby improving the accuracy of extracting an associated word.

For example, in (e), if a value based on a sum of the semantic distance to the search word included in the first concept map and the semantic distance to the search word included in the second concept map is equal to or smaller than a second threshold, the at least one word whose difference is equal to or larger than the first threshold may be extracted as the associated word.

According to this aspect, a word that indicates a concept shared by the first and second users in relation to a search word but that is semantically far from the search word can be excluded from associated words. Optimal products, optimal services, and the like, therefore, can be recommended to the first group.

For example, in (f), the result of the search based on the search word and the associated word may be displayed to the first or second user belonging to the first group.

According to this aspect, a product, a service, or the like can be recommended to the first group by displaying a result of a search.

For example, in (f), the result of the search based on the search word and the associated word may be displayed in descending order of the degree of association between the search word and the association word included in the first association map.

According to this aspect, a result of a search can be displayed in order of recommendation to the first group.

For example, in (f), the result of the search based on the search word and the associated word may be displayed above a content highly evaluated by other users.

According to this aspect, a result of a search to be recommended to the first group can take priority in display.

For example, the first to third concept maps may be generated on the basis of a result of brain measurement.

According to this aspect, the first to third concept maps can be generated on the basis of a result of brain measurement.

For example, the first to third concept maps may be generated on the basis of the result of brain measurement employing functional magnetic resonance imaging.

According to this aspect, the first to third concept maps can be generated on the basis of a result of brain measurement employing functional magnetic resonance imaging.

A search apparatus according to an aspect of the present disclosure is a search apparatus including a processor and a memory. The processor (a) obtains a search word, (b) obtains, from the memory, first to third concept maps including a plurality of words and semantic distances between the plurality of words, the first concept map being unique to a first user belonging to a first group, the second concept map being unique to a second user belonging to the first group, the third concept map being unique to a third user belonging to a second group different from the first group, (c) obtains a first association map including degrees of association indicating how close the semantic distances included in the first concept map and the semantic distances included in the second concept map are to each other, (d) obtains a second association map including degrees of association indicating how close the semantic distances included in the first concept map, the semantic distances included in the second concept map, and the semantic distances included in the third concept map are to one another, (e) extracts, from the plurality of words as an associated word, at least one word whose difference between the degree of association with the search word included in the first association map and the degree of association with the search word included in the second association map is equal to or larger than a first threshold, and (f) outputs a result of a search based on the search word and the associated word.

According to this aspect, an associated word, which indicates a concept shared by the first and second users belonging to the first group in relation to a search word, is extracted on the basis of the first and second concept maps. Since a search is performed on the basis of the extracted associated word and the search word, optimal products that have not been purchased by the first or second user, optimal products that have not been used by the first or second user, and the like can be recommended to the first group. Furthermore, a word whose difference between the degree of association with the search word included in the first association map and the degree of association with the search word included in the second association map is equal to or larger than the first threshold is extracted from the plurality of words as an associated word. As a result, an associated word, which indicates a concept shared only by the first and second users belonging to the first group, can be extracted, thereby improving the accuracy of extracting an associated word.

For example, in (e), if a value based on a sum of the semantic distance to the search word included in the first concept map and the semantic distance to the search word included in the second concept map is equal to or smaller than a second threshold, the at least one word whose difference is equal to or larger than the first threshold may be extracted as the associated word.

According to this aspect, a word that indicates a concept shared by the first and second users in relation to a search word but that is semantically far from the search word can be excluded from associated words. Optimal products, optimal services, and the like, therefore, can be recommended to the first group.

For example, the processor may further (g) display the result of the search based on the search word and the associated word to the first or second user belonging to the first group.

According to this aspect, a product, a service, or the like can be recommended to the first group by displaying a result of a search.

For example, in (g), the result of the search based on the search word and the associated word may be displayed in descending order of the degree of association between the search word and the association word included in the first association map.

According to this aspect, a result of a search can be displayed in order of recommendation to the first group.

For example, in (g), the result of the search based on the search word and the associated word may be displayed above a content highly evaluated by other users.

According to this aspect, a result of a search to be recommended to the first group can take priority in display.

For example, the first to third concept maps may be generated on the basis of a result of brain measurement.

According to this aspect, the first to third concept maps can be generated on the basis of a result of brain measurement.

For example, the first to third concept maps may be generated on the basis of the result of brain measurement employing functional magnetic resonance imaging.

According to this aspect, the first to third concept maps can be generated on the basis of a result of brain measurement employing functional magnetic resonance imaging.

A recording medium according to an aspect of the present disclosure is a nonvolatile computer-readable recording medium storing a control program for causing an apparatus including a processor to perform a process. The process includes (a) obtaining a search word, (b) obtaining, from a memory, first to third concept maps including a plurality of words and semantic distances between the plurality of words, the first concept map being unique to a first user belonging to a first group, the second concept map being unique to a second user belonging to the first group, the third concept map being unique to a third user belonging to a second group different from the first group, (c) obtaining a first association map including degrees of association indicating how close the semantic distances included in the first concept map and the semantic distances included in the second concept map are to each other, (d) obtaining a second association map including degrees of association indicating how close the semantic distances included in the first concept map, the semantic distances included in the second concept map, and the semantic distances included in the third concept map are to one another, (e) extracting, from the plurality of words as an associated word, at least one word whose difference between the degree of association with the search word included in the first association map and the degree of association with the search word included in the second association map is equal to or larger than a first threshold, and (f) outputting a result of a search based on the search word and the associated word.

According to this aspect, an associated word, which indicates a concept shared by the first and second users belonging to the first group in relation to a search word, is extracted on the basis of the first and second concept maps. Since a search is performed on the basis of the extracted associated word and the search word, optimal products that have not been purchased by the first or second user, optimal products that have not been used by the first or second user, and the like can be recommended to the first group. Furthermore, a word whose difference between the degree of association with the search word included in the first association map and the degree of association with the search word included in the second association map is equal to or larger than the first threshold is extracted from the plurality of words as an associated word. As a result, an associated word, which indicates a concept shared only by the first and second users belonging to the first group, can be extracted, thereby improving the accuracy of extracting an associated word.

It should be noted that these general or specific aspects may be implemented as a system, a method, an integrated circuit, a computer program, a computer-readable recording medium including a nonvolatile recording medium such as a CD-ROM, or any selective combination thereof.

Embodiments will be specifically described hereinafter with reference to the drawings.

The following embodiments are general or specific examples. Values, shapes, materials, components, arrangement positions and connection modes of the components, steps, the order of the steps, and the like are examples, and do not limit the present disclosure. Among the components described in the following embodiments, ones not described in the independent claims, which define broadest concepts, will be described as arbitrary components.

First Embodiment 1-1. Outline of Search System

Figure 1B:
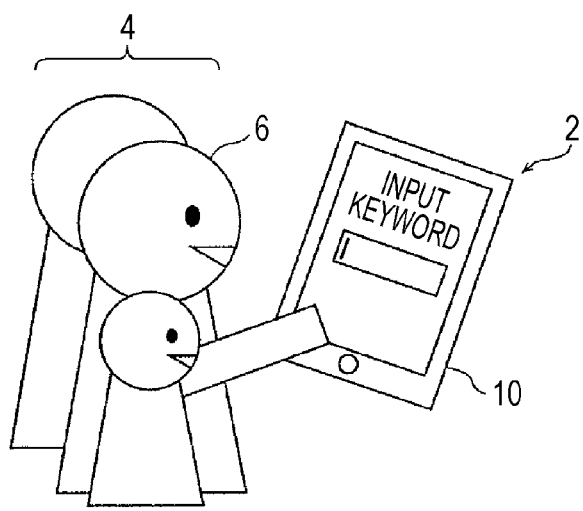
FIG. 1B is a diagram illustrating another example of the application of the search system according to the first embodiment.
Figure 2:
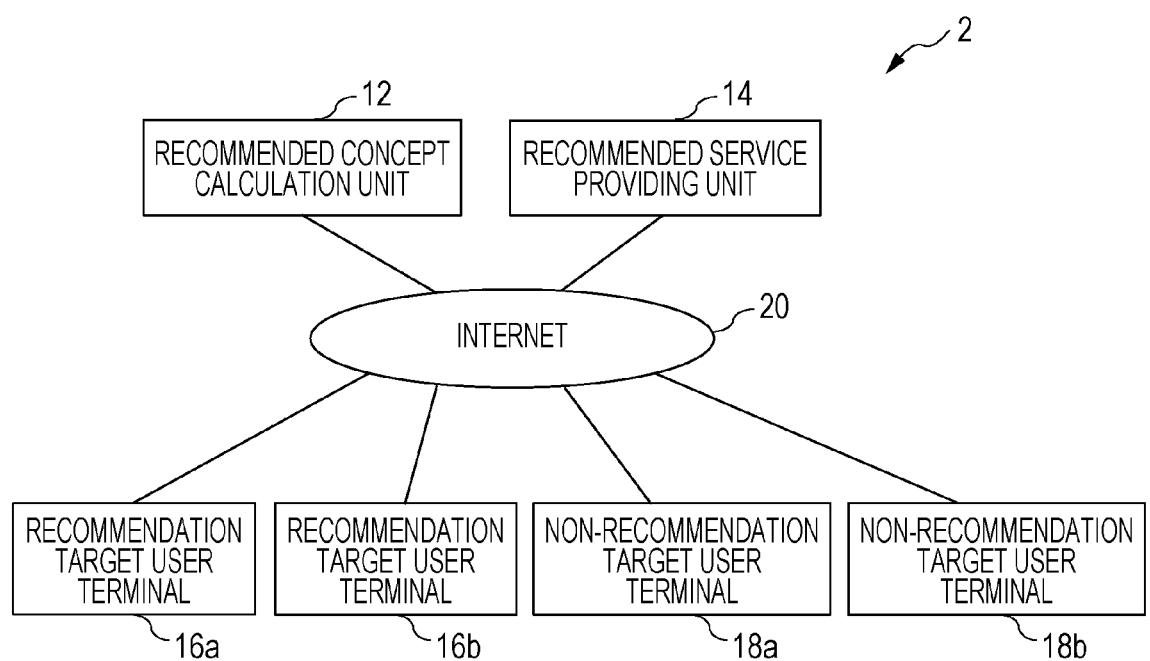
FIG. 2 is a block diagram illustrating an outline of the search system according to the first embodiment.

First, a search system 2 according to a first embodiment will be described with reference to FIGS. 1A to 2. FIG. 1A is a diagram illustrating an example of application of the search system 2 according to the first embodiment. FIG. 1B is a diagram illustrating another example of the application of the search system 2 according to the first embodiment. FIG. 2 is a block diagram illustrating an outline of the search system 2 according to the first embodiment.

As illustrated in FIGS. 1A and 1B, the search system 2 according to the first embodiment is a system for performing a search in an electronic commerce (EC) website or the like and outputting a result of the search when a user 6 belonging to a certain group 4 has input a search word. As a result, the search system 2 recommends, to the certain group 4, a product, a service, or the like that will suit tastes of all users 6 belonging to the certain group 4.

In the example illustrated in FIG. 1A, the search system 2 includes an audio terminal 8 including an audio interface. The user 6 speaks to the audio terminal 8 to input a search word to the audio terminal 8. As a result, the audio terminal 8 outputs a result of the search as sound. More specifically, if the user 6 inputs a search word for finding recommended restaurants or the like to the audio terminal 8, the audio terminal 8 provides an appropriate service according to the search word as sound.

In the example illustrated in FIG. 1B, the search system 2 includes an information terminal 10 including a touch panel, such as a tablet or a smartphone. The user 6 operates the touch panel of the information terminal 10 to input a search word. As a result, the information terminal 10 displays a result of the search on the touch panel.

As illustrated in FIG. 2, the search system 2 includes a recommended concept calculation unit 12 (an example of a search apparatus), a recommended service providing unit 14, a plurality of recommendation target user terminals 16a and 16b, and a plurality of non-recommendation target user terminals 18a and 18b. These components are communicably connected to one another through an Internet 20.

The recommendation target user terminals 16a and 16b are information terminals operated by a first user and a second user, respectively, belonging to a first group. The first group is a group to which the search system 2 is to recommend a product, a service, or the like. The recommendation target user terminals 16a and 16b receive a search word input by the first or second user and transmit the received search word to the recommended concept calculation unit 12.

The non-recommendation target user terminals 18a and 18b are information terminal operated by a third user and a fourth user, respectively, belonging to a second group different from the first group. The second group is a group to which the search system 2 is not to recommend a product, a service, or the like.

The recommended concept calculation unit 12 receives a search word transmitted from one of the plurality of recommendation target user terminals 16a and 16b. The recommended concept calculation unit 12 adds, to the received search word, an associated word indicating a group shared concept, which is shared by the first and second users belonging to the first group, and transmits a combination of the search words and the associated word to the recommended service providing unit 14 as recommended concepts.

The recommended service providing unit 14 receives recommended concepts transmitted from the recommended concept calculation unit 12. The recommended service providing unit 14 performs a search on the basis of the received recommended concepts and transmits a result of the search to at least one of the recommendation target user terminals 16a and 16b as a result of the recommendation.

1-2. Configuration of Recommendation Target User Terminal

Figure 3:
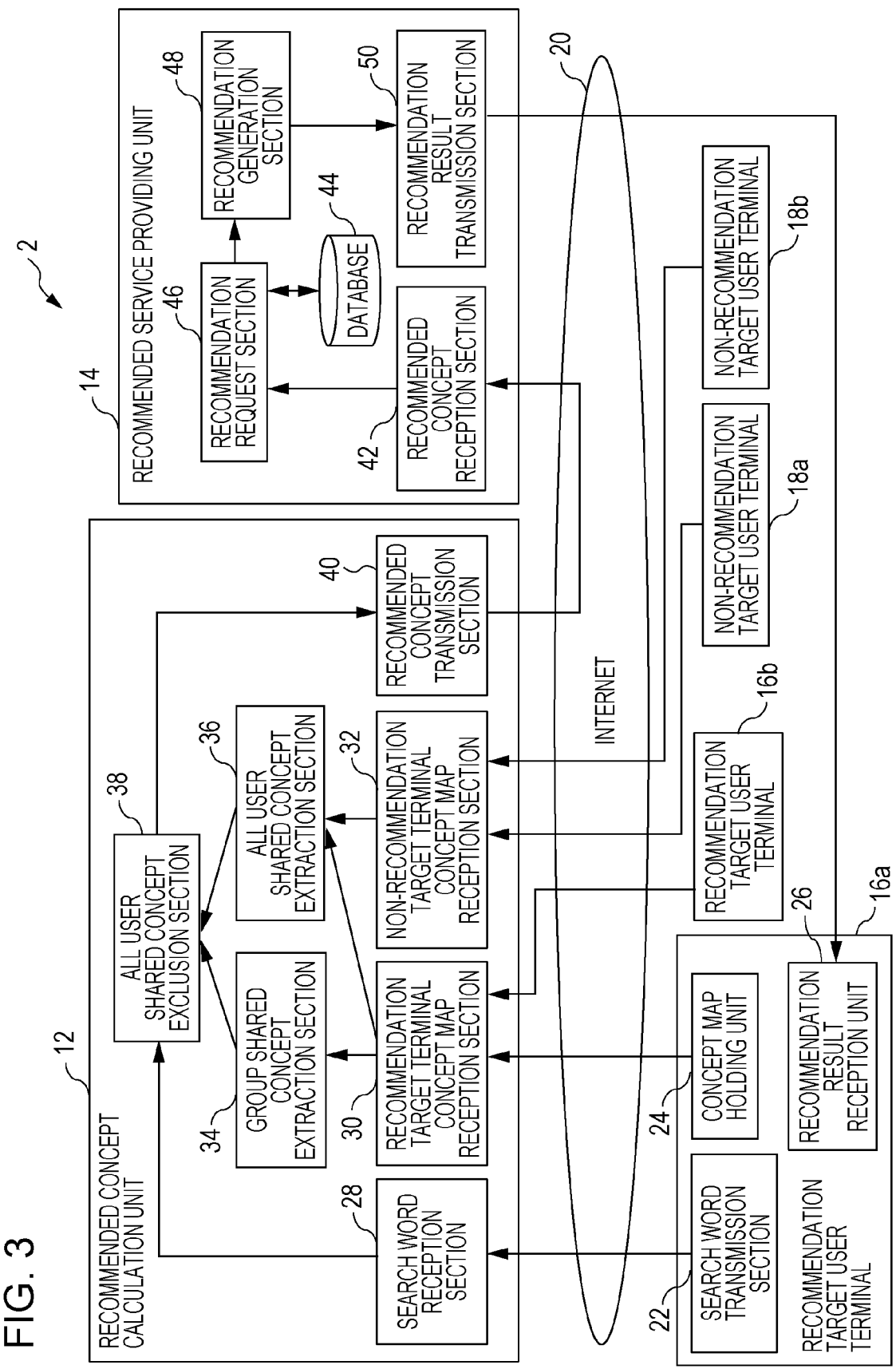
FIG. 3 is a block diagram illustrating the configuration of the search system according to the first embodiment.

Next, the configuration of the recommendation target user terminal 16a will be described with reference to FIG. 3. FIG. 3 is a block diagram illustrating the configuration of the search system 2 according to the first embodiment. Because the recommendation target user terminals 16a and 16b have the same configuration, only the configuration of the recommendation target user terminal 16a will be described hereinafter.

As illustrated in FIG. 3, the recommendation target user terminal 16a includes a search word transmission unit 22, a concept map holding unit 24, and a recommendation result reception unit 26.

The search word transmission unit 22 transmits a search word input by the first user, who is the user of the recommendation target user terminal 16a, to the recommended concept calculation unit 12.

The concept map holding unit 24 is a memory holding a first concept map unique to the first user. The concept map holding unit 24 transmits the first concept map to the recommended concept calculation unit 12 on the basis of a request from the recommended concept calculation unit 12.

The recommendation result reception unit 26 receives a result of recommendation transmitted from the recommended service providing unit 14. The result of recommendation received by the recommendation result reception unit 26 is displayed, for example, on a display unit 70 (refer to FIG. 16A) of the recommendation target user terminal 16a, such as a touch panel.

A concept map holding unit of the recommendation target user terminal 16b holds a second concept map unique to the second user, who is the user of the recommendation target user terminal 16b. Similarly, the non-recommendation target user terminals 18a and 18b each include a concept map holding unit. The concept map holding unit of the non-recommendation target user terminal 18a holds a third concept map unique to the third user, who is the user of the non-recommendation target user terminal 18a. The concept map holding unit of the non-recommendation target user terminal 18b holds a fourth concept map unique to the fourth user, who is the user of the non-recommendation target user terminal 18b.

The configuration of the first to fourth concept maps will be described with reference to FIGS. 4A to 6. FIG. 4A is a diagram illustrating an example of the first concept map. FIG. 4B is a diagram illustrating an example of the second concept map. FIG. 4C is a diagram illustrating an example of the third concept map. FIG. 4D is a diagram illustrating an example of the fourth concept map. FIGS. 5 and 6 are diagrams conceptually illustrating the first to fourth concept maps.

The first to fourth concept maps are associated with the first to fourth users, respectively, and represented as two-dimensional tables illustrated in FIGS. 4A to 4D. As illustrated in FIGS. 4A to 4D, the first to fourth concept maps include a plurality of general words (an example of words) and semantic distances between the plurality of general words.

The first to fourth concept maps each include, for example, 1,000 general words. In this case, the first to fourth concept maps are two-dimensional tables of 1,000 rows and 1,000 columns. The general words are English words indicating concepts used in daily life, such as "home", "rent", "owner", and "house". In FIGS. 4A to 4D, the first to fourth concept maps are represented as two-dimensional tables of eight rows and eight columns including eight words for convenience of description.

The semantic distances are relative values indicating semantic closeness between the general words. In the examples illustrated in FIGS. 4A to 4D, the semantic distances are integers of 0 to 10. Smaller semantic distances indicate that general words are semantically close to each other. More specifically, when the semantic distance is 1, two different general words are semantically closest to each other, and when the semantic distance is 10, two different general words are semantically farthest from each other. Semantic distances between the same general words, such as "home" and "home", are 0.

A semantic distance of the first user between a first word and a second word may be information indicating how easily the first user associates the first word and the second word with each other.

In the example illustrated in FIG. 4A, semantic distances to "home" are 1 in the case of "house", "car", and "weekend", 2 in the case of "rent" and "place", 4 in the case of "owner", and 5 in the case of "park". In the example illustrated in FIG. 4B, semantic distances to "home" is 1 in the case of "house" and "car", 2 in the case of "owner" and "place", 3 in the case of "rent", and 5 in the case of "park" and "weekend".

For the first user, "home" and "weekend", for example, are semantically close concepts, which can indicate that the first user usually spend his/her weekends at home. For the second user, on the other hand, "home" and "weekend", for example, are semantically far concepts, which can indicate that the second user usually goes out on weekends. That is, differences between the semantic distances of the first concept map illustrated in FIG. 4A and the semantic distances of the second concept map illustrated in FIG. 4B indicate individual differences between the first user and the second user in terms of concepts. Similarly, differences between the semantic distances of the third concept map illustrated in FIG. 4C and the semantic distances of the fourth concept map illustrated in FIG. 4D indicate individual differences between the third user and the fourth user in terms of concepts.

The first to fourth concept maps are generated, for example, on the basis of results of brain measurement. More specifically, brain reactions of the first to fourth users are measured through functional magnetic resonance imaging (fMRI) while the first to fourth users are listening to a plurality of stories. The stories include about 1,000 English words. Relationships between the English words are visually mapped on the cerebral cortex on the basis of results of the measurement of the brain reactions. Semantic distances between the 1,000 English words can be defined, for example, using a method described in the following example of the related art. That is, as illustrated in FIGS. 5 and 6, for example, concept maps including semantic distances between a plurality of English words can be generated. FIGS. 5 and 6 illustrate concept maps unique to different users. Physical distances between the English words illustrated in FIGS. 5 and 6 indicate individual differences between the users in terms of concepts. Semantic distances within a range of 0.0 to 1.0 can be defined by normalizing the physical distances between the English words on the cerebral cortex.

For the brain measurement, a known method disclosed in Alexander G. Huth, Wendy A. de Heer, Thomas L. Griffiths, Frederic E. Theunissen, and Jack L. Gallant, "Natural speech reveals the semantic maps that tile human cerebral cortex", Nature, Vol. 532, p. 453-458, Apr. 28, 2016, Nature Publishing Group, for example, may be used.

Concept maps may be generated using another method, instead, insofar as semantic distances between a plurality of concepts are defined. Concept maps may be generated, for example, by estimating semantic distances between a plurality of concepts on the basis of speech and behavior of the first to fourth users in their daily lives.

1-3. Configuration of Recommended Concept Calculation Unit

Next, the configuration of the recommended concept calculation unit 12 will be described with reference to FIG. 3. As illustrated in FIG. 3, the recommended concept calculation unit 12 includes a search word reception section 28, a recommendation target terminal concept map reception section 30, a non-recommendation target terminal concept map reception section 32, a group shared concept extraction section 34, an all user shared concept extraction section 36, an all user shared concept exclusion section 38, and a recommended concept transmission section 40.

The search word reception section 28 receives search words transmitted from the search word transmission unit 22 of the recommendation target user terminal 16a and a search word transmission unit of the recommendation target user terminal 16b.

The recommendation target terminal concept map reception section 30 receives the first and second concept maps transmitted from the concept map holding unit 24 of the recommendation target user terminal 16a and the concept map holding unit of the recommendation target user terminal 16b, respectively.

The non-recommendation target terminal concept map reception section 32 receives the third and fourth concept maps transmitted from the concept map holding unit of the non-recommendation target user terminal 18a and the concept map holding unit of the non-recommendation target user terminal 18b, respectively.

The group shared concept extraction section 34 extracts, as a group shared concept, at least one general word shared by the first and second concept maps received by the recommendation target terminal concept map reception section 30 on the basis of the first and second concept maps.

The all user shared concept extraction section 36 extracts, as an all user shared concept, at least one general word shared by the first to fourth concept maps on the basis of the first and second concept maps received by the recommendation target terminal concept map reception section 30 and the third and fourth concept maps received by the non-recommendation target terminal concept map reception section 32.

The all user shared concept exclusion section 38 extracts an associated word that is closely associated with a search word received by the search word reception section 28 and that indicates a concept shared only by the first group by excluding an all user shared concept extracted by the all user shared concept extraction section 36 from group shared concepts extracted by the group shared concept extraction section 34. The all user shared concept exclusion section 38 outputs a combination of the search word and the associated word to the keyword conversion unit 40 as recommended concepts.

The recommended concept transmission section 40 transmits, to the recommended service providing unit 14, the recommended concepts output from the all user shared concept exclusion section 38.

1-4. Configuration of Recommended Service Providing Unit

Next, the configuration of the recommended service providing unit 14 will be described with reference to FIG. 3. As illustrated in FIG. 3, the recommended service providing unit 14 includes a recommended concept reception section 42, a database 44, a recommendation request section 46, a recommendation generation section 48, and a recommendation result transmission section 50.

The recommended concept reception section 42 receives recommended concepts transmitted from the recommended concept calculation unit 12 and outputs the received recommended concepts to the recommendation request section 46.

The database 44 stores data to be recommended to the first group or the like, such as data regarding a property.

The recommendation request section 46 refers to the database 44 and extracts data most closely associated with recommended concepts output from the recommended concept reception section 42.

The recommendation generation section 48 converts data extracted by the recommendation request section 46 into a format suitable to be displayed on the display unit 70 (refer to FIG. 16A) of the recommendation target user terminal 16a. The recommendation generation section 48 outputs the resultant data to the recommendation result transmission section 50 as a recommendation to be given to the first group.

The recommendation result transmission section 50 transmits, as a result of recommendation, a recommendation output from the recommendation generation section 48 to the recommendation target user terminal 16a to which a search word has been input.

Figure 7:
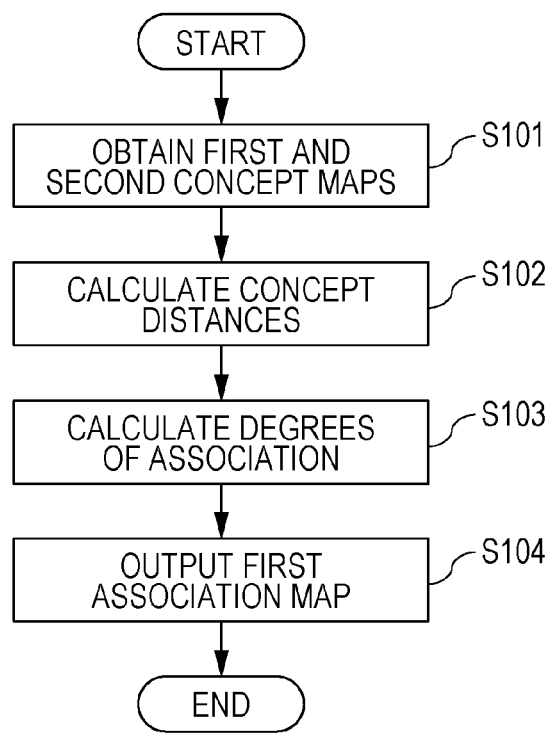
FIG. 7 is a flowchart illustrating an operation procedure of a group shared concept extraction section according to the first embodiment.

1-5. Operation of Search System 1-5-1. Operation of Group Shared Concept Extraction Section The operation of the group shared concept extraction section 34 will be described with reference to FIGS. 7 to 8B. FIG. 7 is a flowchart illustrating an operation procedure of the group shared concept extraction section 34 according to the first embodiment. FIG. 8A is a diagram illustrating an example of concept distances calculated by the group shared concept extraction section 34 according to the first embodiment. FIG. 8B is a diagram illustrating an example of degrees of association calculated by the group shared concept extraction section 34 according to the first embodiment.

A case will be described hereinafter in which the first user belonging to the first group inputs a search word "home" to the recommendation target user terminal 16a in order to find properties suitable for the first group.

As illustrated in FIG. 7, first, the group shared concept extraction section 34 obtains the first and second concept maps from the recommendation target terminal concept map reception section 30 (S101). Next, the group shared concept extraction section 34 calculates concept distances between the first and second concept maps on the basis of the following expression (1) (S102).

$$D_{ij} = |d_{Aij} - d_{Bij}|^2 \qquad (1)$$

In expression (1), $D_{ij}$ denotes a concept distance in an i-th row and a j-th column, $d_{Aij}$ denotes a semantic distance of the first concept map in the i-th row and the j-th column, and $d_{Bij}$ denotes a semantic distance of the second concept map in the i-th row and the j-th column. The semantic distance of the first concept map in the i-th row and the j-th column illustrated in FIG. 4A, for example, is a semantic distance (e.g., "2") between a general word (e.g., "home") in the i-th row of the first concept map and a general word (e.g., "rent") in the j-th column of the first concept map.

Concept distances indicate how semantically close the first and second concept maps are to each other. Smaller concept distances indicate that a semantic distance between a general word in the i-th row of the first concept map and a general word in the j-th column of the first concept map and a semantic distance between a general word in the i-th row of the second concept map and a general word in the j-th column of the second concept map are close to each other. As illustrated in FIG. 8A, the group shared concept extraction section 34 calculates the concept distances between the first concept map illustrated in FIG. 4A and the second concept map illustrated in FIG. 4B on the basis of expression (1).

Although a case in which two users belong to the first group has been described in the present embodiment, if three or more users belong to the first group, the group shared concept extraction section 34 may calculate concept distances between any two of three or more concept maps.

Next, the group shared concept extraction section 34 converts the concept distances $D_{ij}$ calculated in step S102 into degrees of association $v_{ij}$ on the basis of the following expression (2) (S103).

$$v_{ij} = \frac{1}{1 + D_{ij}} \qquad (2)$$

Degrees of association indicate how semantically close the first and second concept maps are to each other. The group shared concept extraction section 34 obtains a first association map illustrated in FIG. 8B, for example, by converting the concept distances illustrated in FIG. 8A into degrees of association on the basis of expression (2). The first association map is a two-dimensional table obtained by converting the concept distances between the first and second concept maps into degrees of association.

In the example illustrated in FIG. 8B, the degrees of association are positive values equal to or smaller than 1.00. Higher degrees of association indicate that the semantic distance between the general word in the i-th row of the first concept map and the general word in the j-th column of the first concept map and the semantic distance between the general word in the i-th row of the second concept map and the general word in the j-th column of the second concept map are close to each other. A degree of association of "car" with "home", for example, is 1.00, which indicates that "home" and "car" are most closely associated with each other for the first and second users. A row of the first association map framed by a broken line 52 in FIG. 8B includes degrees of association of the search word "home" with a plurality of general words.

In the present embodiment, the group shared concept extraction section 34 extracts all the general words illustrated in FIG. 8B as group shared concepts. Alternatively, the group shared concept extraction section 34 may extract general words having degrees of association equal to or higher than a certain threshold (e.g., "0.50") as group shared concepts.

Lastly, the group shared concept extraction section 34 outputs the first association map obtained in step S103 to the all user shared concept exclusion section 38 (S104).

1-5-2. Operation of All User Shared Concept Extraction Section

Figure 9:
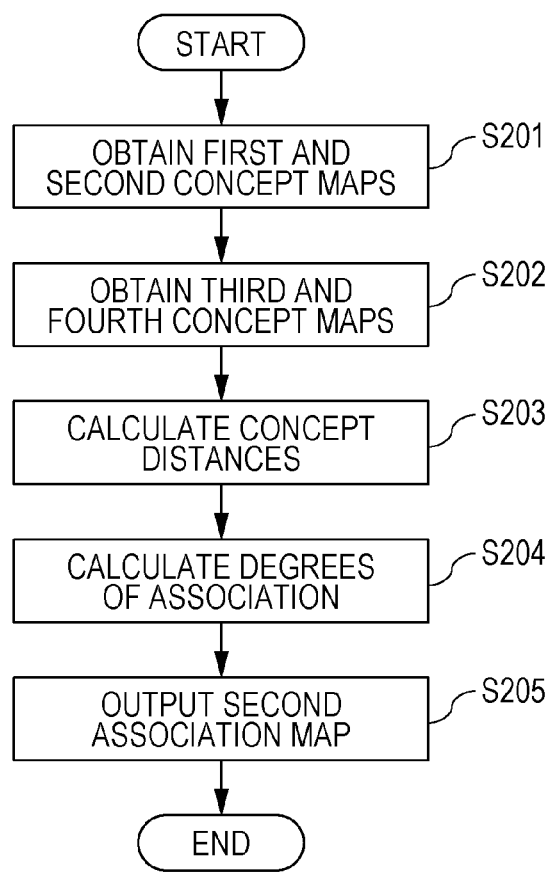
FIG. 9 is a flowchart illustrating an operation procedure of an all user shared concept extraction section according to the first embodiment.

The operation of the all user shared concept extraction section 36 will be described with reference to FIGS. 9 to 10B. FIG. 9 is a flowchart illustrating an operation procedure of the all user shared concept extraction section 36 according to the first embodiment. FIG. 10A is a diagram illustrating an example of concept distances calculated by the all user shared concept extraction section 36 according to the first embodiment. FIG. 10B is a diagram illustrating an example of degrees of association calculated by the all user shared concept extraction section 36 according to the first embodiment.

As illustrated in FIG. 9, first, the all user shared concept extraction section 36 obtains the first and second concept maps from the recommendation target terminal concept map reception section 30 (S201). Next, the all user shared concept extraction section 36 obtains the third and fourth concept maps from the non-recommendation target terminal concept map reception section 32 (S202). Next, the all user shared concept extraction section 36 calculates concept distances between the first to fourth concept maps on the basis of the following expression (3) (S203).

$$D'_{ij} = |x_{ijs} - d_{yijs}| \quad (3)$$

In expression (3), $D'_{ij}$ denotes a concept distance in the i-th row and the j-th column, and $d_{xij}$ and $d_{yij}$ denote semantic distances between any two of the first to fourth concept maps in the i-th row and the j-th column. As illustrated in FIG. 10A, the all user shared concept extraction section 36 calculates the concept distances between the first to fourth concept maps illustrated in FIGS. 4A to 4D on the basis of expression (3).

In the case of "car" and "weekend", for example, $D'_{78} = |d_{178} - d_{278}|^2 + |d_{178} - d_{378}|^2 |d_{178} - d_{478}|^2 + |d_{278} - d_{378}|^2 + |d_{278} - d_{478}|^2 + |d_{378} - d_{478}|^2 = |2-1|^2 + |2-4|^2 + |2-1|^2 + |1-4|^2 + |1-1|^2 + |4-1|^2$.

Next, the all user shared concept extraction section 36 converts the concept distances $D'_{ij}$ calculated in step S203 into degrees of association $v'_{ij}$ on the basis of the following expression (4) (S204).

$$v'_{ij} = \frac{1}{1 + D'_{ij}} \quad (4)$$

The all user shared concept extraction section 36 obtains a second association map illustrated in FIG. 10B, for example, by converting the concept distances illustrated in FIG. 10A into degrees of association on the basis of expression (4). The second association map is a two-dimensional table obtained by converting the concept distances between the first to fourth concept maps into degrees of association. A degree of association of "house" with "home", for example, is 1.00, which indicates that "home" and "house" are most closely associated with each other for the first to fourth users. A row of the second association map framed by a broken line 54 in FIG. 10B includes degrees of association of "home" with the plurality of general words.

In the present embodiment, the all user shared concept extraction section 36 extracts all the general words illustrated in FIG. 10B as all user shared concepts. Alternatively, the all user shared concept extraction section 36 may extract general words having degrees of association equal to or higher than a certain threshold (e.g., "0.50") as all user shared concepts.

Lastly, the all user shared concept extraction section 36 outputs the second association map obtained in step S204 to the all user shared concept exclusion section 38 (S205).

1-5-3. Operation of All User Shared Concept Exclusion Section

Figure 11:
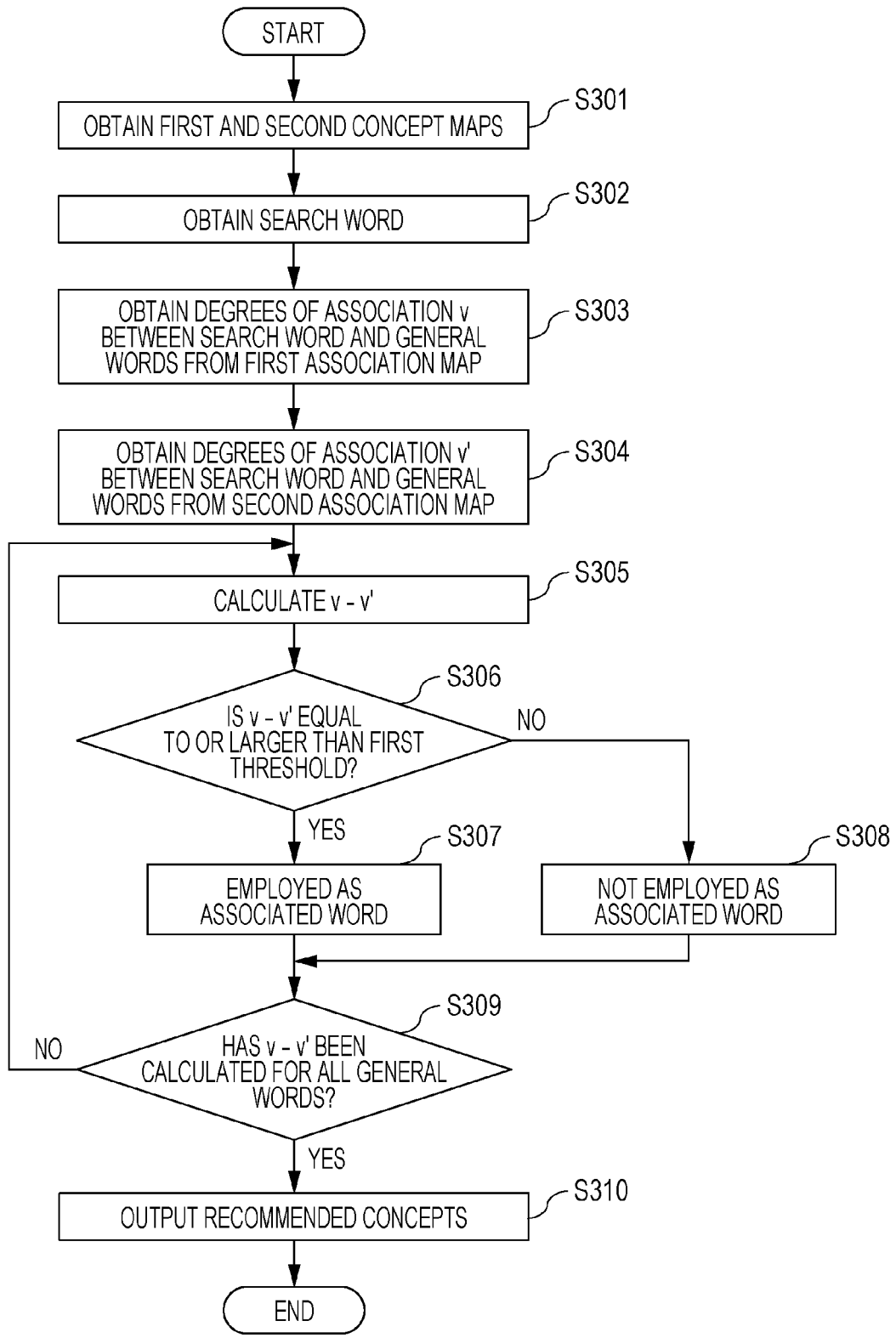
FIG. 11 is a flowchart illustrating an operation procedure of the all user shared concept exclusion section according to the first embodiment.

The operation of the all user shared concept exclusion section 38 will be described with reference to FIG. 11. FIG. 11 is a flowchart illustrating an operation procedure of the all user shared concept exclusion section 38 according to the first embodiment.

As illustrated in FIG. 11, first, the all user shared concept exclusion section 38 obtains the first and second association maps from the group shared concept extraction section 34 and the all user shared concept extraction section 36, respectively (S301). Next, the all user shared concept exclusion section 38 obtains the search word "home" from the search word reception section 28 (S302).

Next, the all user shared concept exclusion section 38 obtains, from the first association map, degrees of association v of a plurality of general words with the search word "home" (S303). More specifically, the all user shared concept exclusion section 38 obtains, from the first association map illustrated in FIG. 8B, degrees of association v of the plurality of general words in the row framed by the broken line 52.

Next, the all user shared concept exclusion section 38 obtains, from the second association map, degrees of association v' of the plurality of general words with the search word "home" (S304). More specifically, the all user shared concept exclusion section 38 obtains, from the second association map illustrated in FIG. 10B, degrees of association v' of the plurality of general words in the row surrounded by the broken line 54.

Next, the all user shared concept exclusion section 38 extracts one of the general words and calculates a difference v−v' between the degree of association v and the degree of association v' for the extracted general word (S305). The all user shared concept exclusion section 38 determines whether the calculated difference v−v' is equal to or larger than a first threshold (e.g., 0.20) (S306).

If the difference v−v' is equal to or larger than the first threshold (YES in S306), the all user shared concept exclusion section 38 employs the extracted general word as an associated word (S307). If the difference v−v' is smaller than the first threshold (NO in S306), on the other hand, the all user shared concept exclusion section 38 does not employ the extracted general word as an associated word (S308). In the examples illustrated in FIGS. 8B and 10B, "rent"

(v−v'=0.30), "park" (v−v'=0.96), and "car" (v−v'=0.96) are employed as associated words.

If the difference v−v' has not been calculated for all the general words (NO in S309), step S305 is performed again. If the difference v−v' has been calculated for all the general words (YES in S309), on the other hand, the all user shared concept exclusion section 38 outputs a combination of the search word "home" and the associated words "rent", "park", and "car" to the recommended concept transmission section 40 as recommended concepts (S310).

Figure 12:
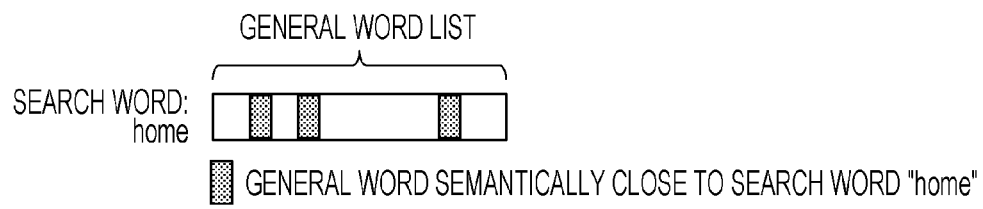
FIG. 12 is a diagram schematically illustrating a correlation matrix extracted from the first concept map.
Figure 13:
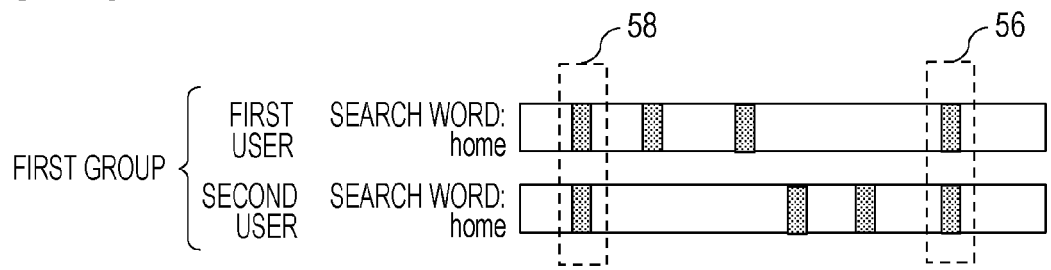
FIG. 13 is a diagram schematically illustrating correlation matrices extracted from the first and second concept maps.
Figure 14:
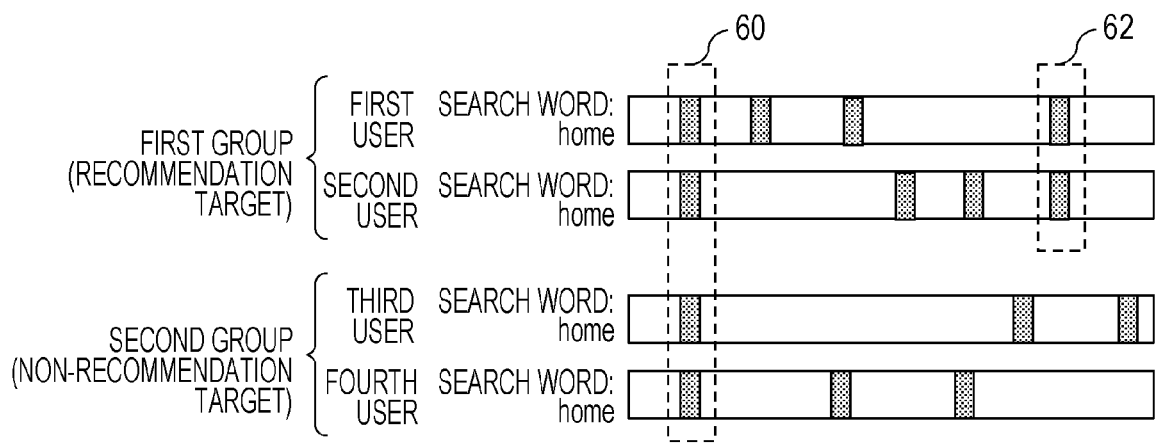
FIG. 14 is a diagram schematically illustrating correlation matrices extracted from the first to fourth concept maps.

A process performed by the all user shared concept exclusion section 38 will be conceptually described with reference to FIGS. 12 to 14. FIG. 12 is a diagram schematically illustrating a correlation matrix generated from the first concept map. FIG. 13 is a diagram schematically illustrating correlation matrices extracted from the first and second concept maps. FIG. 14 is a diagram schematically illustrating correlation matrices extracted from the first to fourth concept maps.

FIG. 12 illustrates a correlation matrix of the search word "home" and the general words generated from the first concept map. In FIG. 12, a horizontal axis represents a list of the general words arranged in a horizontal line. In FIG. 12, the general words semantically close to the search word "home" are hatched.

FIG. 13 illustrates a correlation matrix generated from the first concept map and a correlation matrix generated from the second concept map. These two correlation matrices are assumed to be generated in the same procedure for the correlation matrix illustrated in FIG. 12. By comparing the two correlation matrices illustrated in FIG. 13, general words semantically close to the search word "home" shared by the first and second users can be extracted. The general words extracted in this manner, however, can include not only a group shared concept 56 (e.g., "rent") shared only by the first and second users but also an all user shared concept 58 (e.g., "house") shared by the first to fourth users and do not distinguish the group shared concept 56 and the all user shared concept 58. If the extracted general words include the all user shared concept 58, it is difficult to employ a general word indicating a concept shared only by the first and second users as an associated word.

FIG. 14 is a diagram illustrating correlation matrices generated from the first to fourth concept maps. By comparing the four correlation matrices illustrated in FIG. 14, the general words semantically close to the search word "home" shared by the first to fourth users can be extracted. The general words extracted in this manner include a group shared concept 62 shared only by the first and second users and do not include an all user shared concept 60 shared by the first to fourth users. A general word indicating a concept shared only by the first and second users, therefore, can be employed as an associated word. That is, the all user shared concept exclusion section 38 performs steps S301 to S310 to solve the problem described with reference to FIG. 13.

1-5-4. Example of Operation of Recommendation Request Section

An example of the recommendation request section 46 of the recommended service providing unit 14 will be described with reference to FIG. 15. FIG. 15 is a diagram illustrating an example of the operation of the recommendation request section 46 according to the first embodiment.

The recommendation request section 46 holds information regarding search queries most closely associated with the general words. As illustrated in FIG. 15, the recommendation request section 46 refers to, on the basis of the information, a property database 68 included in the database 44 in such a way as to give priority to search queries 66 most closely associated with associated words 64 (e.g., "rent", "park", and "car") included in recommended concepts output from the recommended concept reception section 42. In the example illustrated in FIG. 15, the search queries 66 are contract terms for "rent", a distance to a nearest park for "park", and presence or absence of a parking lot for "car".

As a result of the reference to the property database 68, the recommendation request section 46 extracts a property E from properties A to F stored in the property database 68, for example, as data most closely associated with the recommended concepts.

1-5-5. Example of Display of Results of Recommendation

Figure 16A:
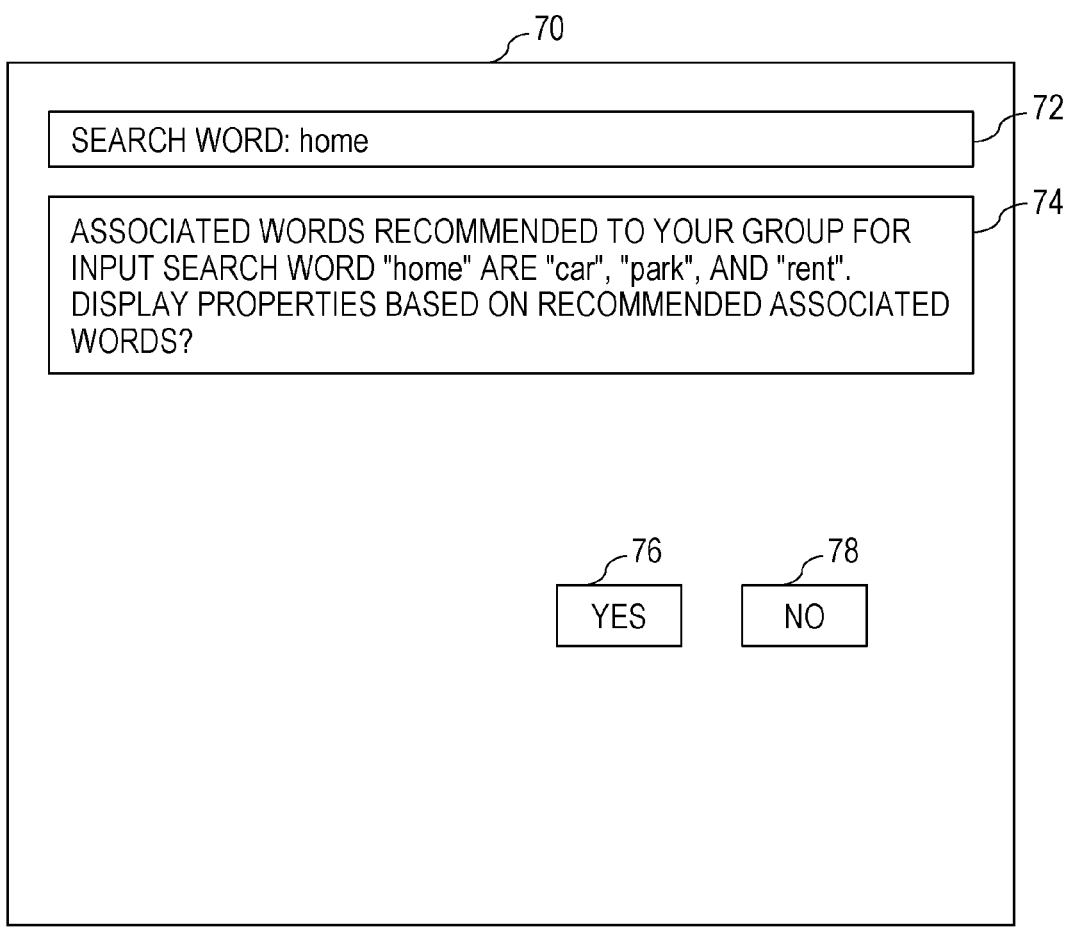
FIG. 16A is a diagram illustrating a first example of results of recommendation displayed on a display unit of a recommendation target user terminal according to the first embodiment.
Figure 16B:
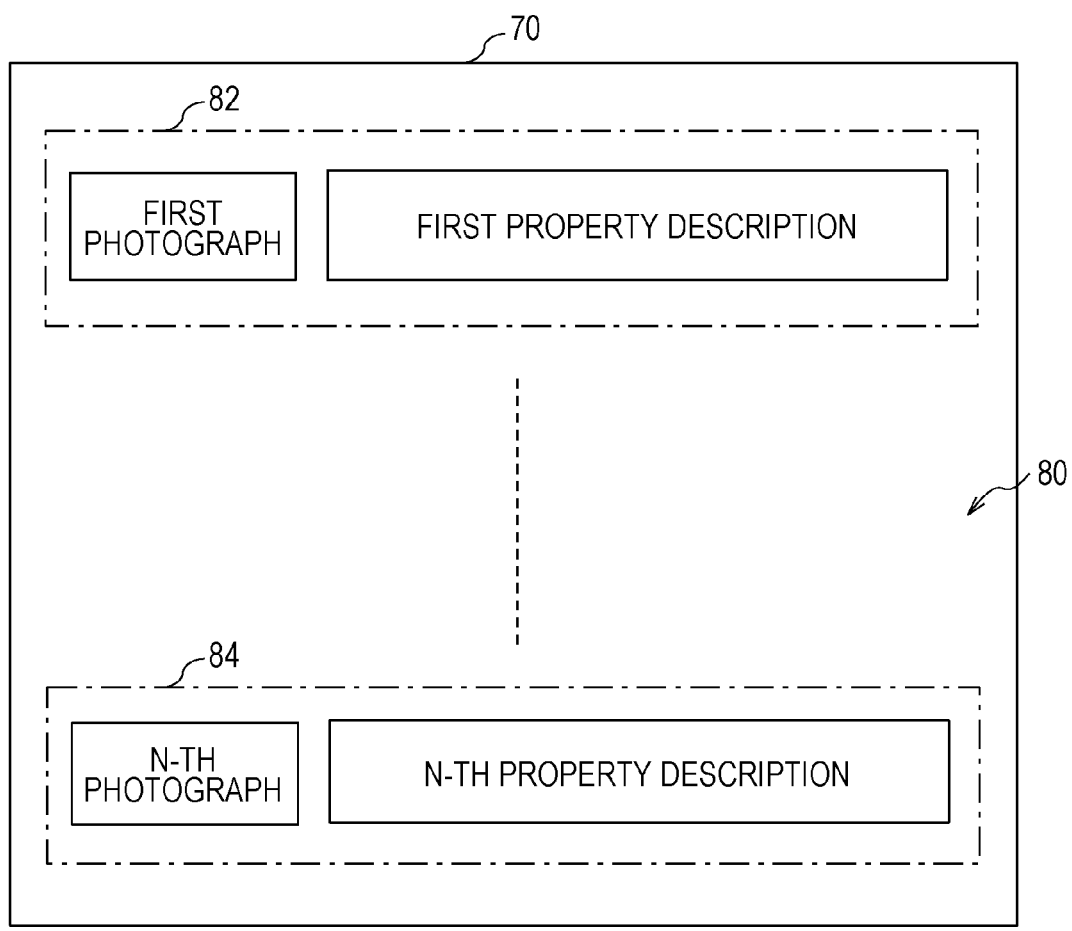
FIG. 16B is a diagram illustrating the first example of the results of recommendation displayed on the display unit of the recommendation target user terminal according to the first embodiment.
Figure 17:
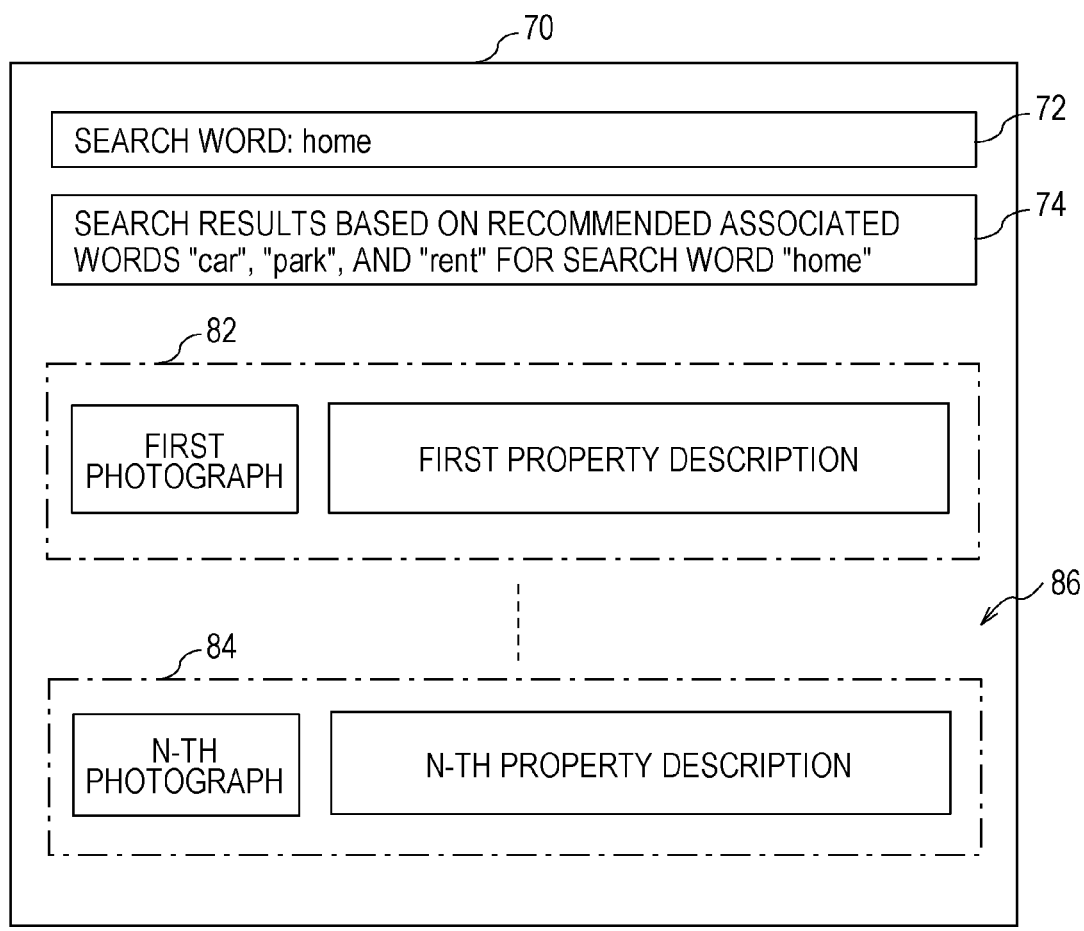
FIG. 17 is a diagram illustrating a second example of the results of recommendation displayed on the display unit of the recommendation target user terminal according to the first embodiment.
Figure 18:
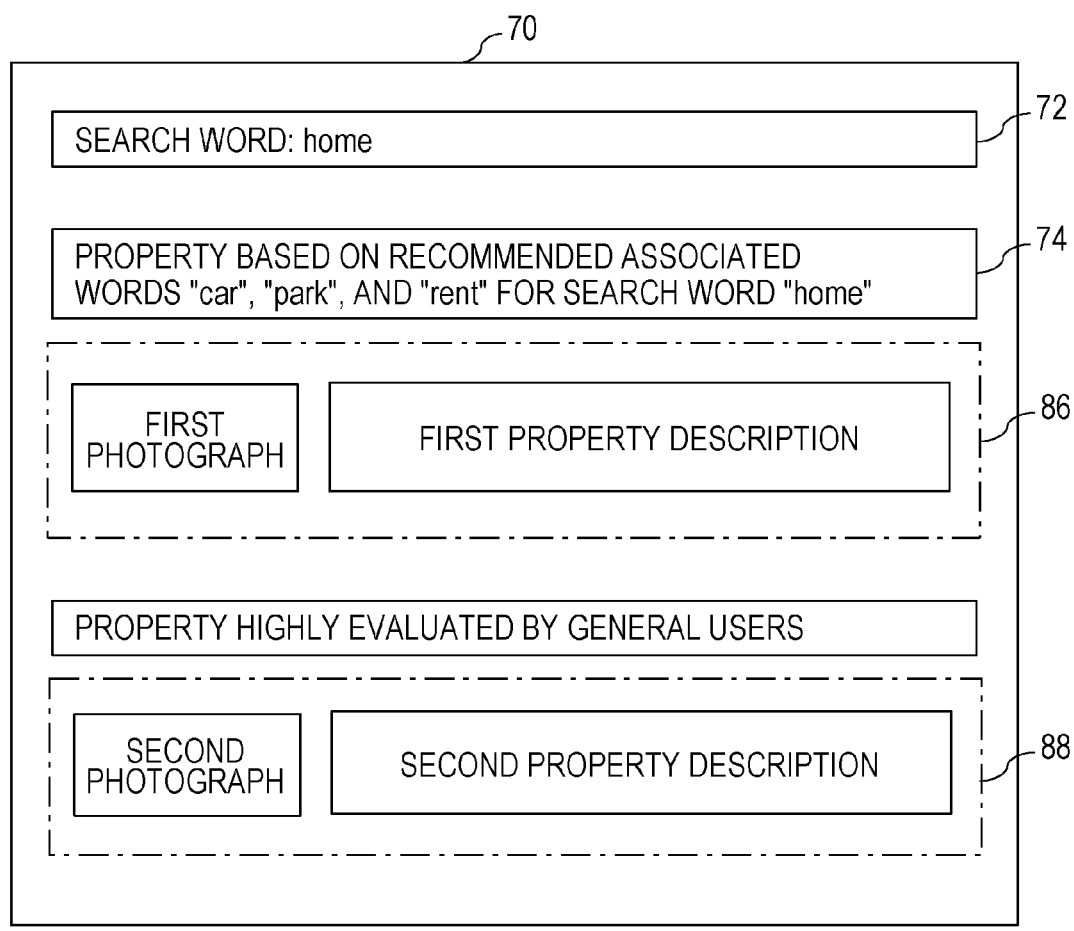
FIG. 18 is a diagram illustrating a third example of the results of recommendation displayed on the display unit of the recommendation target user terminal according to the first embodiment.

Next, an example of results of recommendation displayed on the display unit 70 of the recommendation target user terminal 16a will be described with reference to FIGS. 16A to 18. FIGS. 16A and 16B are diagrams illustrating a first example of results of recommendation displayed on the display unit 70 of the recommendation target user terminal 16a according to the first embodiment. FIG. 17 is a diagram illustrating a second example of the results of recommendation displayed on the display unit 70 of the recommendation target user terminal 16a according to the first embodiment. FIG. 18 is a diagram illustrating a third example of the results of recommendation displayed on the display unit 70 of the recommendation target user terminal 16a according to the first embodiment.

In the first example illustrated in FIG. 16A, a display area 72 for displaying an input search word (e.g., "home"), a display area 74 for displaying associated words (e.g., "rent", "park", and "car") included in the results of recommendation, and option buttons 76 and 78 are displayed on the display unit 70 of the recommendation target user terminal 16a. The first user touches the option button 76 when he/she desires to display the results of recommendation and touches the option button 78 when he/she does not desire to display the results of recommendation.

If the first user touches the option button 76, a recommendation result display screen 80 is displayed on the display unit 70 of the recommendation target user terminal 16a as illustrated in FIG. 16B. First to N-th results of recommendation 82 to 84 are displayed on the recommendation result display screen 80. The first result of recommendation 82, for example, includes a photograph and description of a first recommended property. A plurality of results of recommendation may be displayed in the recommendation result display screen 80 in descending order of the degree of association included in the first association map.

In the second example illustrated in FIG. 17, a display area 72 for displaying an input search word, a display area 74 for displaying associated words included in the results of recommendation, and a display area 86 for displaying the results of recommendation are displayed on the display unit 70 of the recommendation target user terminal 16a. In the display area 86, first to N-th results of recommendation 82 to 84 are displayed.

In the third example illustrated in FIG. 18, a display area 72 for displaying an input search word, a display area 74 for displaying associated words included in the results of recommendation, a display area 88 for displaying the result of recommendation, and a display area 88 for displaying a property highly evaluated by general users are displayed on the display unit 70 of the recommendation target user terminal 16a. The display area 86 is displayed above the display area 88. In the display area 88, a content popular among the users 6 of the search system 2 is displayed.

1-6. Advantageous Effects

As described above, an associated word indicating a concept shared by the first and second users belonging to the first group in relation to a search word is extracted on the basis of the first and second concept maps. Since a search is performed on the basis of the associated word and the search word, an optimal product, an optimal service, or the like can be recommended to the first group even if the first or second user has not purchased or used the product, the service, or the like.

Furthermore, as described above, a general word whose difference v–v' between a degree of association with a search word included in the first association map and a degree of association with the search word included in the second association map is equal to or larger than the first threshold is employed from a plurality of general words as an associated word. As a result, an associated word indicating a concept shared only by the first and second users belonging to the first group can be extracted, thereby improving the accuracy of extracting an associated word.

Second Embodiment

2-1. Configuration of Recommended Concept Calculation Unit

Figure 19:
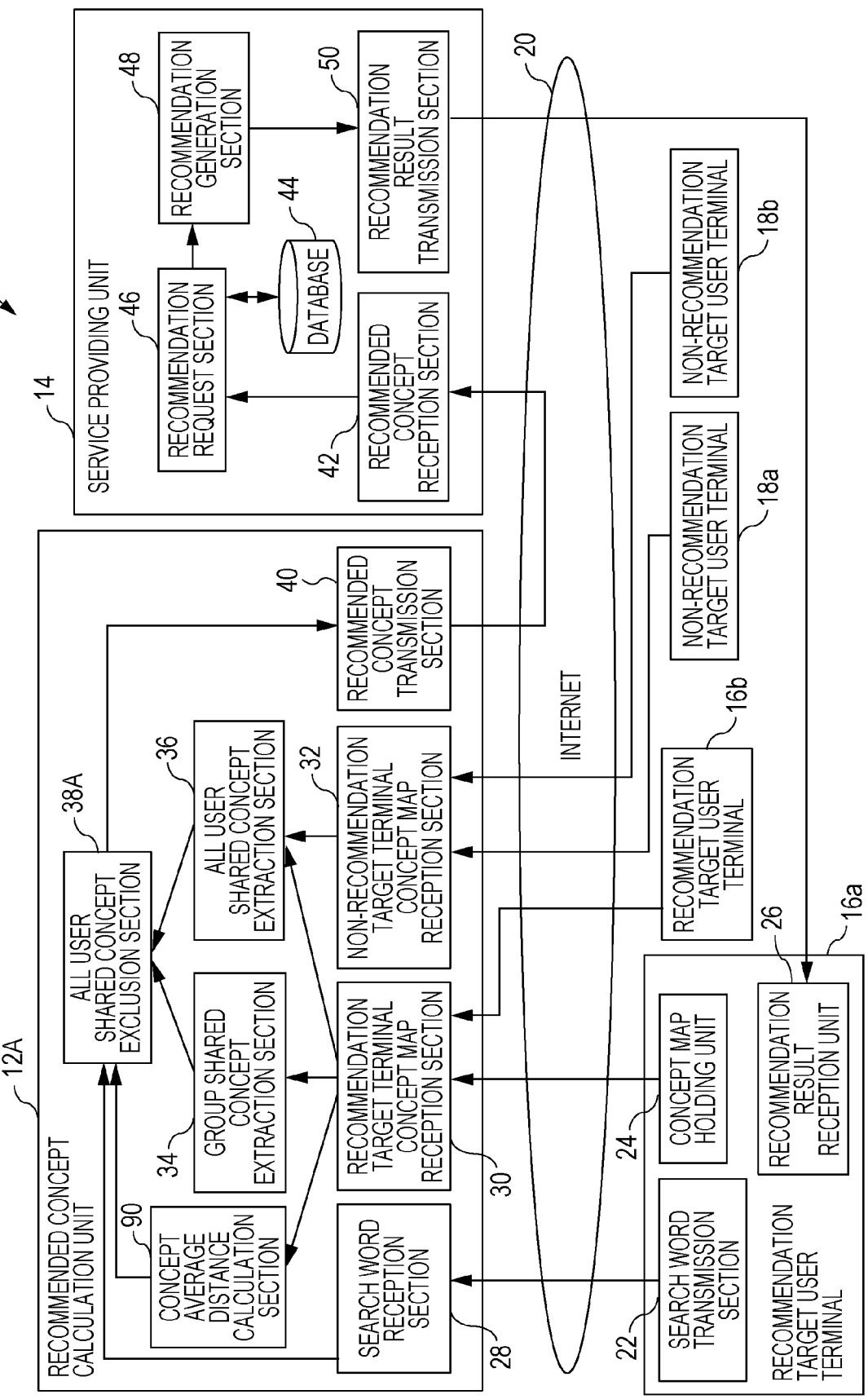
FIG. 19 is a block diagram illustrating the configuration of a search system according to a second embodiment.

The configuration of a recommended concept calculation unit 12A of a search system 2A according to a second embodiment will be described with reference to FIGS. 19 and 20. FIG. 19 is a block diagram illustrating the configuration of the search system 2A according to the second embodiment. FIG. 20 is a diagram illustrating an example of concept average distances calculated by a concept average distance calculation section 90 according to the second embodiment. In the following embodiments, the same components as in the first embodiment are given the same reference numerals, and description thereof is omitted.

As illustrated in FIG. 19A, the search system 2A according to the second embodiment is different from the search system 2 according to the first embodiment in terms of the configuration of the recommended concept calculation unit 12A. More specifically, the recommended concept calculation unit 12A includes the concept average distance calculation section 90 in addition to the components described in the first embodiment.

The concept average distance calculation section 90 calculates concept average distances on the basis of first and second concept maps received by the recommendation target terminal concept map reception section 30 and outputs the calculated concept average distances to the all user shared concept exclusion section 38A. More specifically, the concept average distance calculation section 90 calculates concept average distances $D_{ave_{ij}}$ on the basis of the following expression (5).

$$D_{ave_{ij}} = \Sigma |d_{x_{ij}} + d_{y_{ijs}}|^2 \quad (5)$$

In expression (5), $D_{ave_{ij}}$ denotes a concept average distance in the i-th row and the j-th column, $d_{x_{ij}}$ denotes a semantic distance of the first concept map in the i-th row and the j-th column, and $d_{y_{ij}}$ denotes a semantic distance of the second concept map in the i-th row and the j-th column. The concept average distance refers to a value based on the sum of a semantic distance of the first concept map and a sematic distance of the second concept map. Larger concept average distances indicate that at least either a semantic distance between a general word in the i-th row of the first concept map and a general word in the j-th column of the first concept map or a semantic distance between the general word in the i-th row of the second concept map and the general word in the j-th column of the second concept map is large. That is, larger concept average distances indicate that a semantic distance between a search word and a general word is large for at least either the first user or the second user. As illustrated in FIG. 20, the concept average distance calculation section 90 calculates concept average distances between semantic distances of the first concept map illustrated in FIG. 4A and semantic distances of the second concept map illustrated in FIG. 4B on the basis of expression (5). A row surrounded by a broken line 92 in FIG. 20 includes concept average distances of the plurality of general words to the search word "home".

2-2. Operation of All User Shared Concept Exclusion Section

Figure 21:
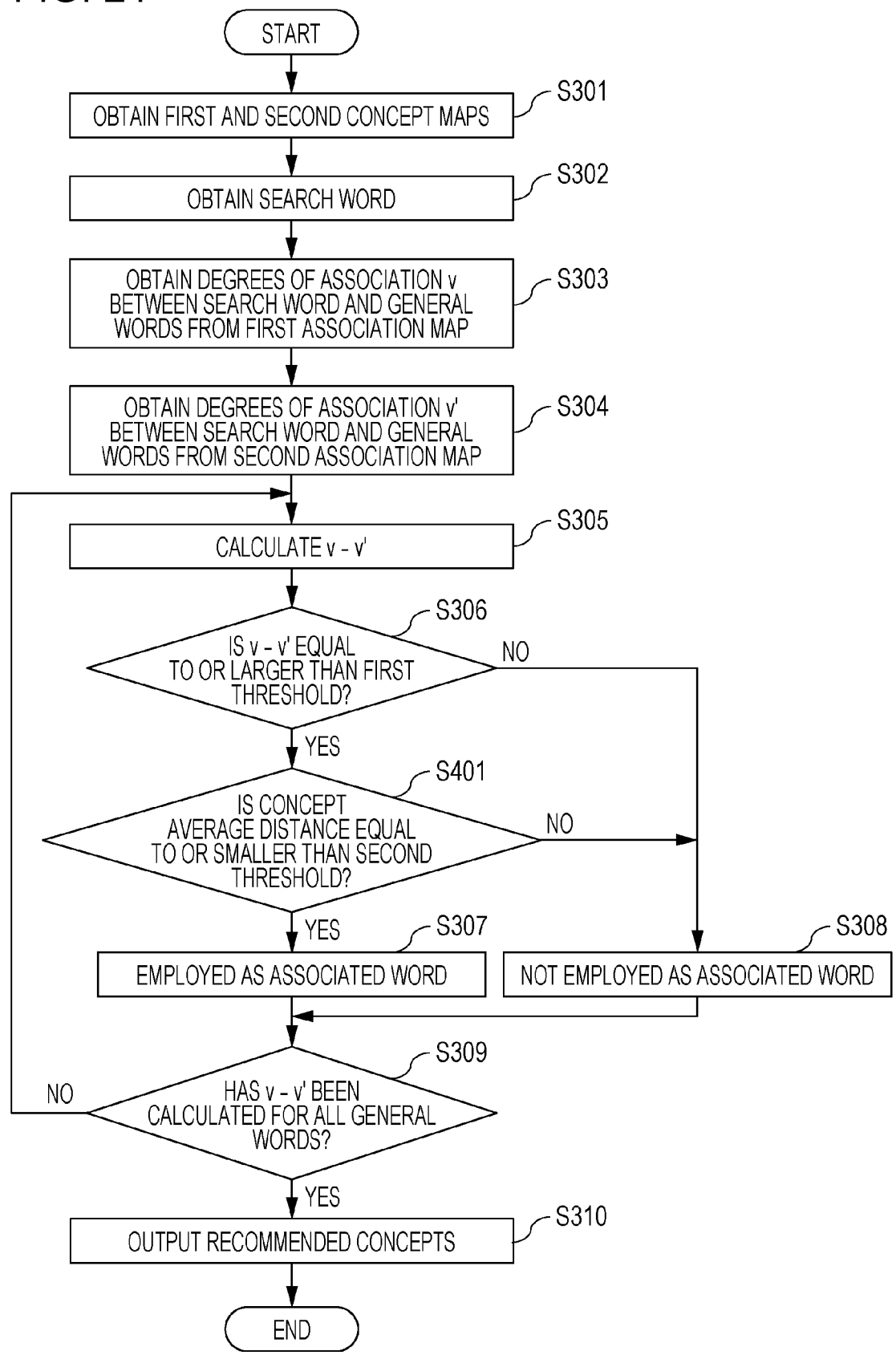
FIG. 21 is a flowchart illustrating an operation procedure of an all user shared concept exclusion section according to the second embodiment.

Next, the operation of the all user shared concept exclusion section 38A will be described with reference to FIG. 21. FIG. 21 is a flowchart illustrating an operation procedure of the all user shared concept exclusion section 38A according to the second embodiment. In the flowchart of FIG. 21, the same steps as those in the flowchart of FIG. 11 are given the same step numerals, and description thereof is omitted.

First, as in the first embodiment, steps S301 to S306 are performed. If the difference v–v' is equal to or larger than the first threshold in step S306 (YES in S306), the all user shared concept exclusion section 38A determines whether a concept average distance is equal to or smaller than a second threshold (e.g., 10) (S401).

If the concept average distance is equal to or smaller than the second threshold (YES in S401), the all user shared concept exclusion section 38A employs the extracted general word as an associated word (S307). If the concept average distance is equal to or larger than the second threshold (NO in S401), on the other hand, the all user shared concept exclusion section 38A does not employ the extracted general word as an associated word (S308).

2-3. Advantageous Effects

As described above, if a concept average distance exceeds the second threshold, the all user shared concept exclusion section 38A does not employ an extracted general word as an associated word. As a result, a general word that indicates a concept shared by the first and second users for a search word but that is semantically far from the search word can be excluded from associated words. Optimal products, optimal services, and the like therefore, can be recommended to the first group.

Third Embodiment

Figure 22:
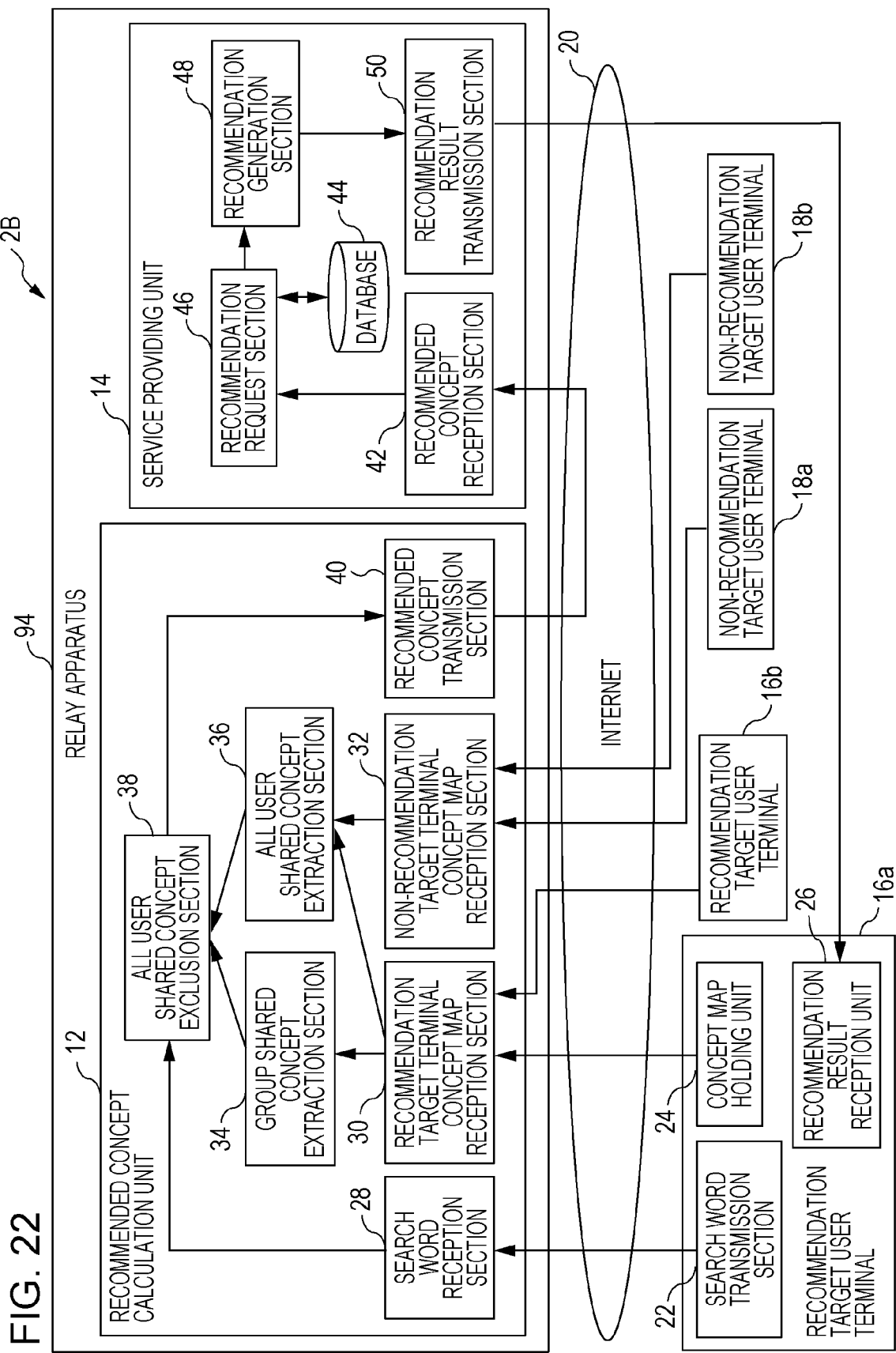
FIG. 22 is a block diagram illustrating the configuration of a search system according to a third embodiment.

The configuration of a search system 2B according to a third embodiment will be described with reference to FIG. 22. FIG. 22 is a block diagram illustrating the configuration of the search system 2B according to the third embodiment.

As illustrated in FIG. 22, in the search system 2B according to the third embodiment, the recommended concept calculation unit 12 and the recommended service providing unit 14 are mounted on a same relay apparatus 94 (an example of a search apparatus). With this configuration, too, the same advantageous effects as in the first embodiment can be produced.

Fourth Embodiment

Figure 23:
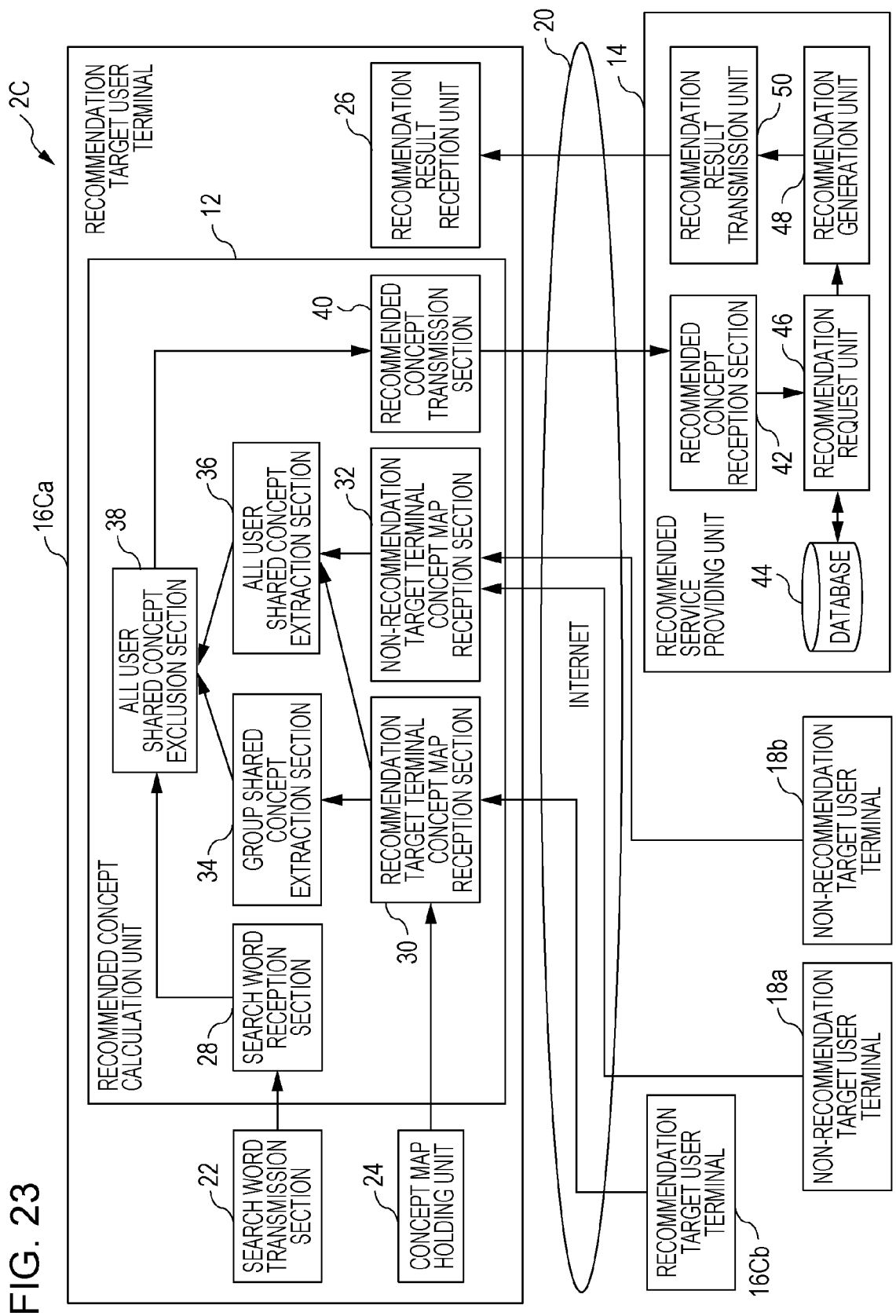
FIG. 23 is a block diagram illustrating the configuration of the search system according to a fourth embodiment.

The configuration of a search system 2C according to a fourth embodiment will be described with reference to FIG. 23. FIG. 23 is a block diagram illustrating the configuration of the search system 2C according to the fourth embodiment.

As illustrated in FIG. 23, in the search system 2C according to the fourth embodiment, the recommended concept calculation unit 12 is mounted on recommendation target user terminals 16Ca and 16Cb (examples of a search apparatus). A recommended concept transmitted from the recommendation target user terminal 16Ca is received by the recommended service providing unit 14. With this configuration, too the same advantageous effects as in the first embodiment can be produced.

Modifications

Although a method for expanding words and the like according to one or a plurality of aspects have been described on the basis of the first to fourth embodiment, the present disclosure is not limited to the first to fourth embodiments. Modes obtained by modifying the embodiments in various ways conceivable by those skilled in the art and modes constructed by combining components in different embodiments may be included in the one or plurality of aspects insofar as the scope of the present disclosure is not deviated from.

Although the all user shared concept extraction section 36 uses the first to fourth concept maps to extract associated words in the above embodiments, the all user shared concept extraction section 36 may use a concept dictionary such as WordNet, instead. WordNet is a known concept dictionary disclosed in documents such as George A. Miller, "WordNet: A Lexical Database for English", Communications of the ACM, Volume 38, Issue 11, November 1995.

Although the all user shared concept extraction section 36 uses the first to fourth concept maps to extract associated words in the above embodiments, the all user shared concept extraction section 36 may use the first to third concept maps, instead, without using the fourth concept map.

Although the database 44 of the recommended service providing unit 14 stores information regarding properties in the above embodiments, a type of information stored in the database 44 is not limited to this. For example, the database 44 may store various pieces of information regarding travel destinations, hotels, or restaurants, instead.

Although the semantic distances in the first to fourth concept maps are represented by integers ranging from 0 to 10 in the above embodiments, the semantic distances are not limited to this. For example, the semantic distances may be represented by decimals ranging from 0.0 to 1.0, instead.

Although smaller values of semantic distance indicate that a plurality of general words are semantically close to each other in the above embodiments, the meaning of semantic distance is not limited to this. For example, larger values of semantic distance may indicate that a plurality of general words are semantically close to each other, instead.

In the above embodiments, the components may be achieved by dedicated hardware or by executing software programs suitable therefor. The components may be achieved by reading and executing software programs recorded in a recording medium such as a hard disk or a semiconductor memory using a program execution unit such as a central processing unit (CPU) or a processor.

Some or all of the functions of the search apparatus according to each of the above embodiments may be achieved by executing programs using a processor such as a CPU.

Some or all of the components included in each of the above-described apparatuses may be achieved by an integrated circuit (IC) card or a separate module removably attached to the apparatus. The IC card or the module is a computer system including a microprocessor, a read-only memory (ROM), and a random-access memory (RAM). The IC card or the module may include an ultra-multifunctional large-scale integration (LSI) circuit. The microprocessor operates in accordance with a computer program to cause the IC card or the module to achieve functions thereof. The IC card or the module may be tamper-resistant.

The present disclosure may be the above-described method. The present disclosure may be a computer program for causing a computer to implement the method or may be a digital signal including the computer program. In addition, the present disclosure may be a computer-readable recording medium storing the computer program or the digital signal, such as a flexible disk, a hard disk, a CD-ROM, a magneto-optical (MO) disk, a digital versatile disc (DVD), a DVD-ROM, a DVD-RAM, a Blu-ray Disc (BD; registered trademark), or a semiconductor memory. In addition, the present disclosure may be the digital signal recorded in the recording medium. In addition, the present disclosure may be implemented by transmitting the computer program or the digital signal through an electrical communication line, a wireless or wired communication line, a network typified by the Internet, datacasting, or the like. In addition, the present disclosure may be a computer system including a microprocessor and a memory. The memory may store the computer program, and the microprocessor may operate in accordance with the computer program. In addition, the present disclosure may be implemented by another independent computer system after the program or the digital signal is recorded in the recording medium and transported or after the program or the digital signal is transported through the network or the like.

The search method in the present disclosure is effective in a search system or the like for recommending a product, a service, or the like to a certain group.

What is claimed is:

1. A search method performed by a processor, the search method comprising:
    (a) obtaining a search word from a first user belonging to a first group;
    (b) obtaining, from a memory, first to third concept maps including a plurality of words and semantic distances between the plurality of words, the first concept map being unique to the first user belonging to the first group, the second concept map being unique to a second user belonging to the first group, the third concept map being unique to a third user belonging to a second group different from the first group;
    (c) obtaining a first association map including degrees of association indicating how close the semantic distances included in the first concept map and the semantic distances included in the second concept map are to each other;
    (d) obtaining a second association map including degrees of association indicating how close the semantic distances included in the first concept map, the semantic distances included in the second concept map, and the semantic distances included in the third concept map are to one another;
    (e) extracting, from the plurality of words as an associated word, at least one word whose difference between the degree of association with the search word included in the first association map and the degree of association with the search word included in the second association map is equal to or larger than a first threshold;
    (f) searching items based on the search word and the associated word, the searched items including a product not purchased or a service not used by the first user and the second user belonging to the first group; and (g) outputting a result of the searching, the result of the searching being a recommendation to all of users of the first group based on the search word and the associated word.

2. The search method according to claim 1, wherein, in (e), if a value based on a sum of the semantic distance to the search word included in the first concept map and the semantic distance to the search word included in the second concept map is equal to or smaller than a second threshold, the at least one word whose difference is equal to or larger than the first threshold is extracted as the associated word.

3. The search method according to claim 1, wherein, in (g), the result of the searching based on the search word and the associated word is displayed to the first or second user belonging to the first group.

4. The search method according to claim 3, wherein, in (g), the result of the searching based on the search word and the associated word is displayed in descending order of the degree of association between the search word and the association word included in the first association map.

5. The search method according to claim 4, wherein, in (g), the result of the searching based on the search word and the associated word is displayed above a content highly evaluated by other users.

6. The search method according to claim 1, wherein the first to third concept maps are generated on the basis of a result of brain measurement.

7. The search method according to claim 6, wherein the first to third concept maps are generated on the basis of the result of brain measurement employing functional magnetic resonance imaging.

8. A search apparatus comprising:
a processor; and
a memory,
wherein the processor
(a) obtains a search word from a first user belonging to a first group,
(b) obtains, from the memory, first to third concept maps including a plurality of words and semantic distances between the plurality of words, the first concept map being unique to the first user belonging to the first group, the second concept map being unique to a second user belonging to the first group, the third concept map being unique to a third user belonging to a second group different from the first group,
(c) obtains a first association map including degrees of association indicating how close the semantic distances included in the first concept map and the semantic distances included in the second concept map are to each other,
(d) obtains a second association map including degrees of association indicating how close the semantic distances included in the first concept map, the semantic distances included in the second concept map, and the semantic distances included in the third concept map are to one another,
(e) extracts, from the plurality of words as an associated word, at least one word whose difference between the degree of association with the search word included in the first association map and the degree of association with the search word included in the second association map is equal to or larger than a first threshold,
(f) searches items based on the search word and the associated word, the searched items including a product not purchased or a service not used by the first user and the second user belonging to the first group; and
(g) outputs a result of the search, the result of the search being a recommendation to all of users of the first group based on the search word and the associated word.

9. The search apparatus according to claim 8, wherein, in (e), if a value based on a sum of the semantic distance to the search word included in the first concept map and the semantic distance to the search word included in the second concept map is equal to or smaller than a second threshold, the at least one word whose difference is equal to or larger than the first threshold is extracted as the associated word.

10. The search apparatus according to claim 8, wherein, in (g), the processor further displays the result of the search based on the search word and the associated word to the first or second user belonging to the first group.

11. The search apparatus according to claim 10, wherein, in (g), the result of the search based on the search word and the associated word is displayed in descending order of the degree of association between the search word and the association word included in the first association map.

12. The search apparatus according to claim 11, wherein, in (g), the result of the search based on the search word and the associated word is displayed above a content highly evaluated by other users.

13. The search apparatus according to claim 8, wherein the first to third concept maps are generated on the basis of a result of brain measurement.

14. The search method according to claim 13, wherein the first to third concept maps are generated on the basis of the result of brain measurement employing functional magnetic resonance imaging.

15. A nonvolatile computer-readable recording medium storing a control program for causing an apparatus including a processor to perform a process, the process comprising:
(a) obtaining a search word from a first user belonging to a first group;
(b) obtaining, from a memory, first to third concept maps including a plurality of words and semantic distances between the plurality of words, the first concept map being unique to the first user belonging to the first group, the second concept map being unique to a second user belonging to the first group, the third concept map being unique to a third user belonging to a second group different from the first group;
(c) obtaining a first association map including degrees of association indicating how close the semantic distances included in the first concept map and the semantic distances included in the second concept map are to each other;
(d) obtaining a second association map including degrees of association indicating how close the semantic distances included in the first concept map, the semantic distances included in the second concept map, and the semantic distances included in the third concept map are to one another;
(e) extracting, from the plurality of words as an associated word, at least one word whose difference between the degree of association with the search word included in the first association map and the degree of association with the search word included in the second association map is equal to or larger than a first threshold;
(f) searching items based on the search word and the associated word, the searched items including a product not purchased or a service not used by the first user and the second user belonging to the first group; and (g) outputting a result of the searching, the result of the searching being a recommendation to all of users of the first group based on the search word and the associated word.

16. A search method, comprising:

(a) obtaining a search word from a first user belonging to a first group;

(b) obtaining, from a memory, first information, second information, and third information, the first information including first semantic distances, each of the first semantic distances being provided between two words included in words from a view point of the first user belonging to the first group, the second information including second semantic distances, each of the second semantic distances being provided between two words included in the words from a view point of a second user belonging to the first group, the third information including third semantic distances, each of the third semantic distances being provided between two words included in the words from a view point of a third user belonging to a second group different from the first group, (c) obtaining a first similarity value based on (i) a semantic distance dli between the search word and a word and (ii) a semantic distance d2i between the search word and the word, the first semantic distances including the semantic distance dli, the second semantic distances including the semantic distance d2i, the words including the search word and the word;

(d) obtaining a second similarity value based on the semantic distance dli, the semantic distance d2, and a semantic distance d3i between the search word and the word, the third semantic distances including the semantic distance d3i;

(e) determining the word as an associated word when a difference between the first similarity value and the second similarity value is equal to or larger than a first threshold value;

(f) searching items based on the search word and the associated word, the searched items including a product not purchased or a service not used by the first user and the second user belonging to the first group; and (g) outputting a result of the searching, the result of the searching being a recommendation to all of users of the first group based on the search word and the associated word.

* * * * *